(12) United States Patent
Crompton et al.

(10) Patent No.: US 9,562,637 B1
(45) Date of Patent: Feb. 7, 2017

(54) LOCKING PIPE JOINT ASSEMBLY, DEVICE AND METHOD

(71) Applicant: Quick Fitting, Inc., Warwick, RI (US)

(72) Inventors: David B. Crompton, Tiverton, RI (US); Libardo Ochoa Dias, Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 15/001,986

(22) Filed: Jan. 20, 2016

Related U.S. Application Data

(60) Provisional application No. 62/221,941, filed on Sep. 22, 2015.

(51) Int. Cl.
| | |
|---|---|
| *F16L 37/091* | (2006.01) |
| *F16L 21/00* | (2006.01) |
| *F16L 21/02* | (2006.01) |
| *F16L 21/08* | (2006.01) |

(52) U.S. Cl.
CPC ............ *F16L 37/091* (2013.01); *F16L 21/007* (2013.01); *F16L 21/02* (2013.01); *F16L 21/08* (2013.01)

(58) Field of Classification Search
CPC ...... F16L 37/091; F16L 37/0915; F16L 17/02; F16L 19/0212; F16L 19/07; F16L 19/005; F16L 21/08; H02G 3/0616
USPC .................. 285/89, 80, 81, 337, 92, 91, 339, 353,285/369
See application file for complete search history.

(56) References Cited

U.S. PATENT DOCUMENTS

| | | | |
|---|---|---|---|
| 1,822,056 | A | 9/1931 | Noble |
| 2,132,636 | A | 10/1938 | Moohs |
| 2,201,372 | A | 5/1940 | Miller |
| 2,230,098 | A | 1/1941 | Wurzburger |
| 2,450,527 | A | 10/1948 | Bohn |
| 2,456,203 | A | 12/1948 | Loepsinger |
| 2,529,821 | A | 11/1950 | Snider |

(Continued)

FOREIGN PATENT DOCUMENTS

| | | |
|---|---|---|
| DE | 4304241 | 8/1994 |
| EP | 0272988 | 6/1988 |

(Continued)

OTHER PUBLICATIONS

Cash ACME, Sharkbite(R) Push Fittings: A Connection System for Copper, CPVC or PEX pipe, Dec. 6, 2006. U.S.

*Primary Examiner* — Daniel P Stodola
*Assistant Examiner* — Zachary Dragicevich
(74) *Attorney, Agent, or Firm* — Williams Mullen PC; Thomas F. Bergert

(57) ABSTRACT

A locking pipe joint assembly, device and method can employ a center body connector, one or more sealing elements, such as a wiper seal and a sealing ring, a sealing ring retainer and a retaining cap. In various embodiments, primary and secondary fastening rings are employed along with a retaining cap sleeve. In embodiments, the retaining cap includes an internal or external thread that mates with an external or internal thread on one side of the center body connector, which allows the retaining cap to tighten the packing arrangement components around an inserted piping or tubing element, and in secure engagement with the interior of the center body connector. In embodiments, a bolt element is provided for further securing of the retaining cap to the center body connector.

24 Claims, 19 Drawing Sheets

(56) References Cited

U.S. PATENT DOCUMENTS

| | | |
|---|---|---|
| 2,774,616 A | 12/1956 | Dodd et al. |
| 2,917,075 A | 12/1959 | Terry |
| 3,060,959 A | 10/1962 | Clark |
| 3,064,983 A | 11/1962 | Halterman |
| 3,066,961 A | 12/1962 | Gerin |
| 3,140,107 A | 7/1964 | Hynes |
| 3,145,730 A | 8/1964 | Presnell |
| 3,365,219 A | 1/1968 | Nicolaus |
| 3,428,337 A | 2/1969 | Read |
| 3,434,745 A | 3/1969 | Jackman |
| 3,679,241 A | 7/1972 | Hoffmann |
| 3,709,526 A | 1/1973 | Cromie |
| 3,805,824 A | 4/1974 | Robbins |
| 3,821,670 A | 6/1974 | Thompson |
| 3,837,687 A | 9/1974 | Leonard |
| 3,885,821 A | 5/1975 | Philibert |
| 3,915,480 A | 10/1975 | Kish et al. |
| 4,009,592 A | 3/1977 | Boerger |
| 4,067,361 A | 1/1978 | Hollister et al. |
| 4,083,586 A | 4/1978 | Helm |
| 4,123,090 A | 10/1978 | Kotsakis et al. |
| 4,146,254 A | 3/1979 | Turner et al. |
| 4,178,023 A | 12/1979 | Guest |
| 4,220,361 A | 9/1980 | Brandenberg |
| 4,275,909 A | 6/1981 | Yoshizawa et al. |
| 4,288,113 A | 9/1981 | Saulnier |
| 4,305,606 A | 12/1981 | Legris |
| 4,383,552 A | 5/1983 | Baker |
| 4,437,493 A | 3/1984 | Okuda et al. |
| 4,440,424 A | 4/1984 | Mode |
| 4,466,640 A | 8/1984 | Van Houtte |
| 4,480,729 A | 11/1984 | Porter |
| 4,508,369 A | 4/1985 | Mode |
| 4,593,943 A | 6/1986 | Hama et al. |
| 4,606,565 A * | 8/1986 | Royston ............... F16L 21/08 285/337 |
| 4,613,172 A | 9/1986 | Schattmaier |
| 4,630,848 A | 12/1986 | Twist et al. |
| 4,637,636 A | 1/1987 | Guest |
| 4,637,640 A | 1/1987 | Fournier et al. |
| 4,645,246 A | 2/1987 | Guest |
| 4,685,706 A | 8/1987 | Kowal et al. |
| 4,712,810 A | 12/1987 | Pozzi |
| 4,747,626 A | 5/1988 | Hama et al. |
| 4,801,158 A * | 1/1989 | Gomi ............... F16L 25/0036 285/330 |
| 4,802,696 A | 2/1989 | Chohan et al. |
| 4,867,198 A | 9/1989 | Faust |
| 4,878,697 A | 11/1989 | Henry |
| 4,880,260 A | 11/1989 | Gotoh et al. |
| 4,895,395 A | 1/1990 | Ceriani |
| 4,919,457 A | 4/1990 | Moretti |
| 5,010,740 A | 4/1991 | Backus et al. |
| 5,024,468 A | 6/1991 | Burge |
| 5,084,954 A | 2/1992 | Klinger |
| 5,108,134 A | 4/1992 | Irwin |
| 5,160,179 A | 11/1992 | Takagi |
| 5,181,751 A | 1/1993 | Kitamura |
| 5,230,539 A | 7/1993 | Olson |
| 5,251,655 A | 10/1993 | Low |
| 5,284,582 A | 2/1994 | Yang |
| 5,292,157 A | 3/1994 | Rubichon |
| 5,370,423 A | 12/1994 | Guest |
| 5,425,347 A | 6/1995 | Zinke, II |
| 5,443,289 A | 8/1995 | Guest |
| 5,487,572 A | 1/1996 | Combot-Courrau et al. |
| 5,524,936 A | 6/1996 | Barr et al. |
| 5,577,530 A | 11/1996 | Condon |
| 5,603,532 A | 2/1997 | Guest |
| 5,711,550 A | 1/1998 | Brandt |
| 5,722,696 A | 3/1998 | Taneya |
| 5,769,462 A | 6/1998 | Angell |
| 5,887,911 A | 3/1999 | Kargula |
| 5,911,443 A | 6/1999 | Le Quere |
| 5,957,509 A | 9/1999 | Komolrochanaporn |
| 5,983,917 A | 11/1999 | Thomas |
| 5,996,632 A | 12/1999 | Vogel et al. |
| 6,012,743 A | 1/2000 | Godeau et al. |
| 6,145,887 A | 11/2000 | Combot-Courrau |
| 6,174,002 B1 | 1/2001 | Rho |
| 6,343,814 B1 | 2/2002 | Bucher et al. |
| 6,357,802 B1 | 3/2002 | Nozato et al. |
| 6,447,019 B1 | 9/2002 | Hosono et al. |
| 6,502,866 B1 * | 1/2003 | Hujisawa ............... F16L 21/00 285/246 |
| 6,517,124 B1 | 2/2003 | Le Quere |
| 6,536,470 B1 | 3/2003 | Carn et al. |
| 6,578,879 B2 | 6/2003 | Muto |
| 6,612,623 B2 | 9/2003 | Salomon-Bahls |
| 6,685,230 B1 | 2/2004 | Bottura |
| 6,764,102 B2 | 7/2004 | Ezura |
| 6,805,385 B2 | 10/2004 | Viegener |
| 6,824,172 B1 | 11/2004 | Komolrochanaporn |
| 6,843,516 B2 | 1/2005 | Bishop et al. |
| 6,869,109 B2 | 3/2005 | Matsushita |
| 6,871,804 B2 | 3/2005 | Hagihara |
| 6,979,026 B2 | 12/2005 | Kasahara et al. |
| 6,988,509 B2 | 1/2006 | Frampton |
| 6,988,746 B2 * | 1/2006 | Olson ............... F16L 19/12 285/149.1 |
| 7,100,948 B2 | 9/2006 | Guest |
| 7,178,836 B2 | 2/2007 | Hoff et al. |
| 7,195,287 B2 | 3/2007 | Wai |
| 7,273,235 B2 | 9/2007 | Coquard et al. |
| 7,316,429 B2 | 1/2008 | Viegener |
| 7,380,836 B2 | 6/2008 | Bogdanowicz et al. |
| 7,445,247 B2 | 11/2008 | Ericksen et al. |
| 7,448,654 B2 | 11/2008 | Le Quere |
| 7,475,913 B2 | 1/2009 | Muto |
| 7,509,971 B2 | 3/2009 | Kajuch |
| 7,530,606 B1 | 5/2009 | Yang |
| 7,621,569 B2 | 11/2009 | Anthoine |
| 7,644,955 B1 | 1/2010 | Komolrochanaporn |
| 7,686,346 B1 | 3/2010 | Buccicone et al. |
| 7,823,932 B2 | 11/2010 | Webb et al. |
| 7,850,208 B2 | 12/2010 | Greenberger |
| 7,862,089 B2 | 1/2011 | Crompton |
| 7,914,050 B2 | 3/2011 | Udhofer et al. |
| 7,942,161 B2 | 5/2011 | Crompton |
| 7,954,861 B2 | 6/2011 | Swift et al. |
| 8,118,331 B2 | 2/2012 | Yamashita et al. |
| 8,205,915 B1 | 6/2012 | Crompton et al. |
| 8,210,576 B2 | 7/2012 | Crompton |
| 8,322,755 B2 | 12/2012 | Kluss et al. |
| 8,398,122 B2 | 3/2013 | Crompton et al. |
| 8,439,404 B2 | 5/2013 | Anton et al. |
| 8,480,134 B2 | 7/2013 | Crompton et al. |
| 8,491,012 B2 | 7/2013 | LeQuere |
| 8,517,431 B2 | 8/2013 | Arning et al. |
| 8,585,100 B2 | 11/2013 | Stults et al. |
| 2003/0057701 A1 | 3/2003 | Koo |
| 2004/0070198 A1 | 4/2004 | Rohrig |
| 2004/0245766 A1 | 12/2004 | Vallee |
| 2005/0194785 A1 * | 9/2005 | Shemtov ............... F16L 19/0212 285/382.7 |
| 2006/0202478 A1 | 9/2006 | Guest |
| 2007/0075542 A1 | 4/2007 | Glaze et al. |
| 2010/0253064 A1 | 10/2010 | LeQuere |
| 2011/0101685 A1 | 5/2011 | Lai |
| 2012/0273709 A1 | 11/2012 | Zhang |
| 2014/0265321 A1 * | 9/2014 | DeCesare ............... H02G 3/0616 285/343 |
| 2015/0323112 A1 * | 11/2015 | Wright ............... F16L 21/08 285/349 |

FOREIGN PATENT DOCUMENTS

| | | |
|---|---|---|
| EP | 1521027 | 4/2005 |
| EP | 2256394 | 12/2010 |
| GB | 2146400 | 4/1985 |
| GB | 2328259 | 2/1999 |

(56) References Cited

FOREIGN PATENT DOCUMENTS

| | | |
|---|---|---|
| JP | 2001032984 | 2/2001 |
| WO | 9939124 | 8/1999 |
| WO | 0079173 | 12/2000 |

* cited by examiner

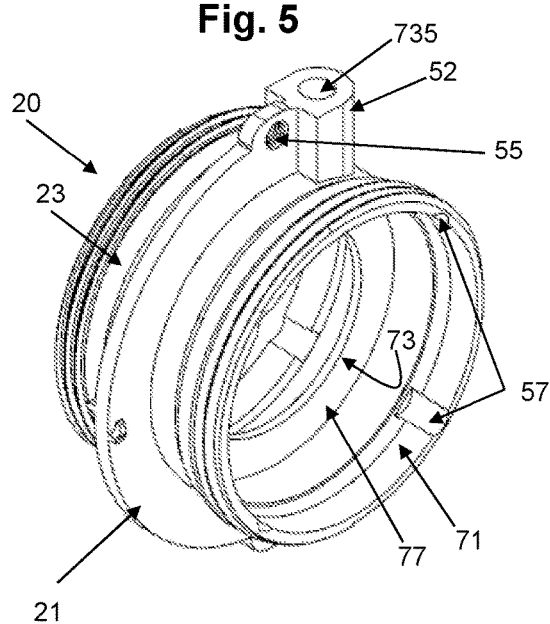
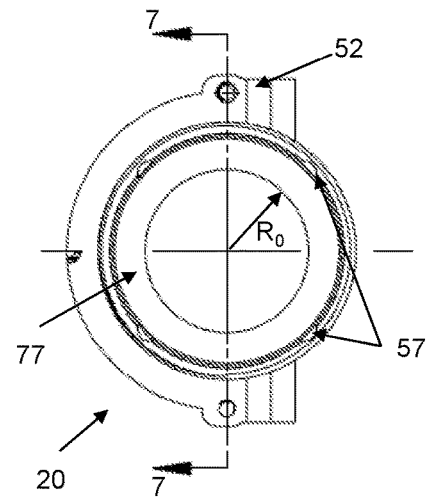
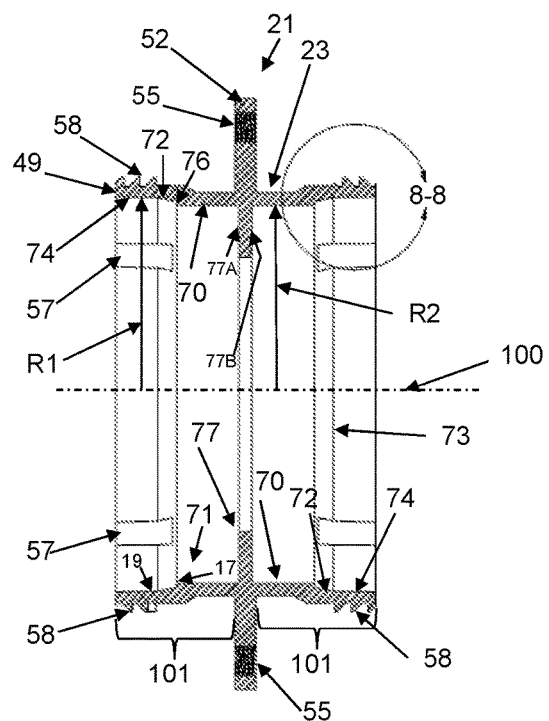
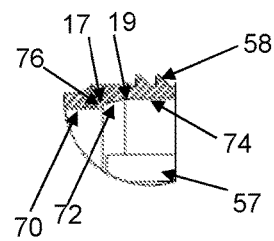
Fig. 5
Fig. 6
Fig. 7
Fig. 8

Fig. 13
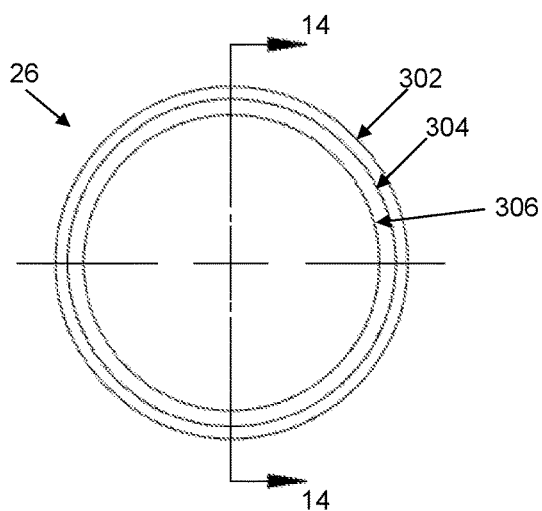
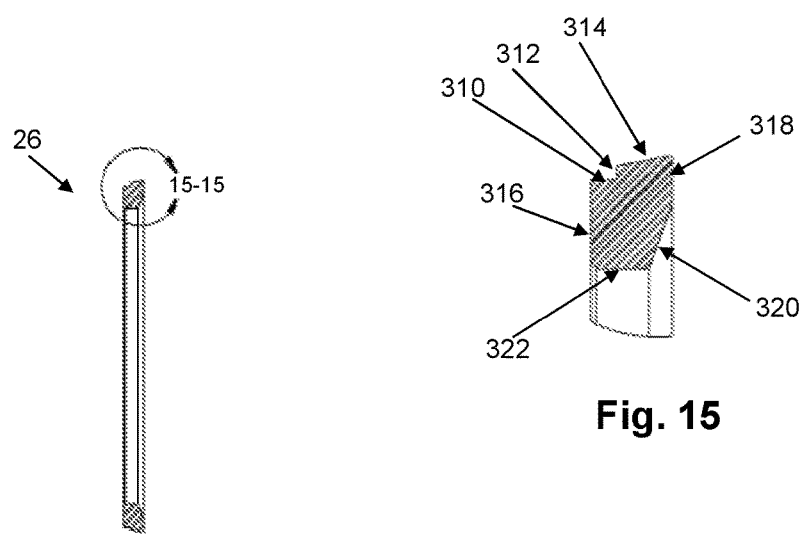
Fig. 14
Fig. 15

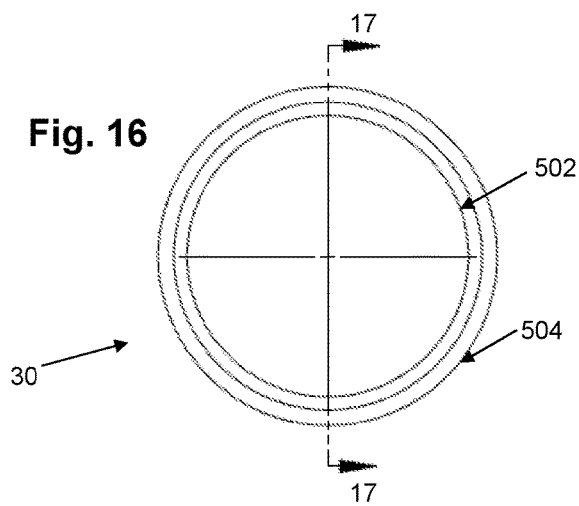
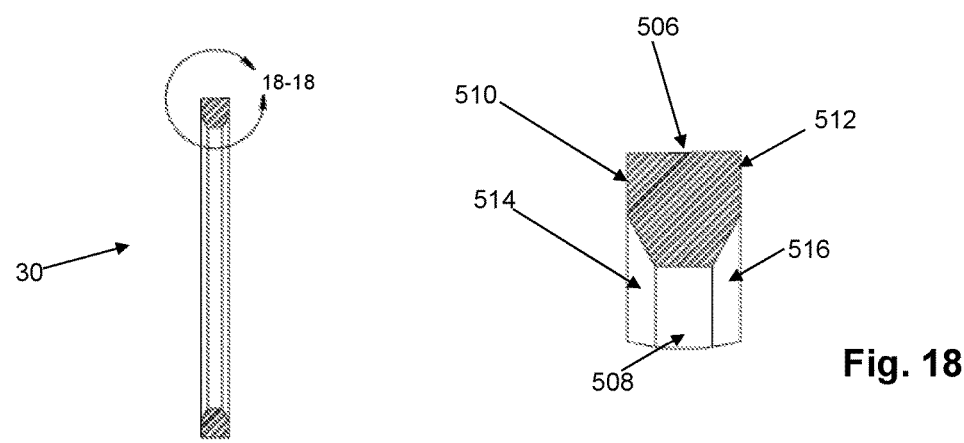
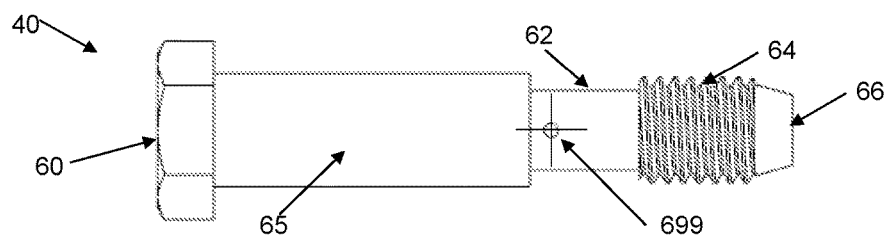

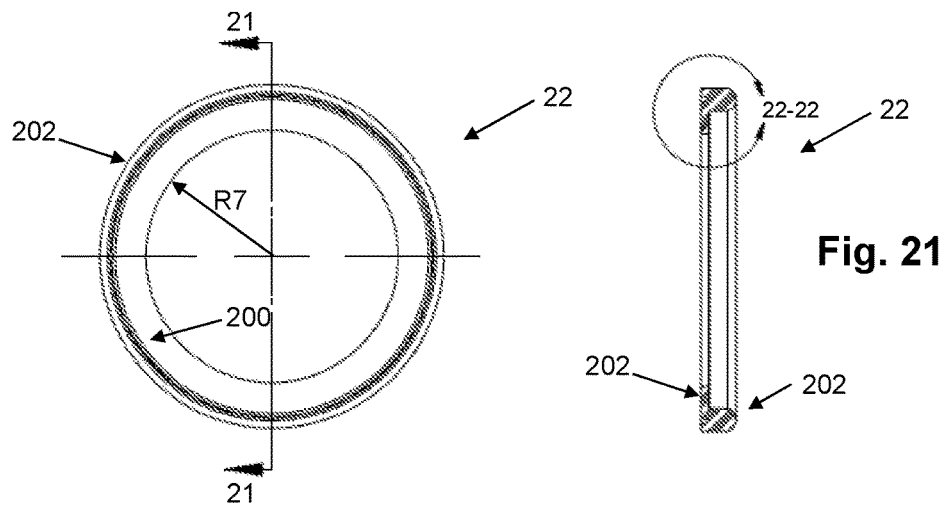
Fig. 20
Fig. 21
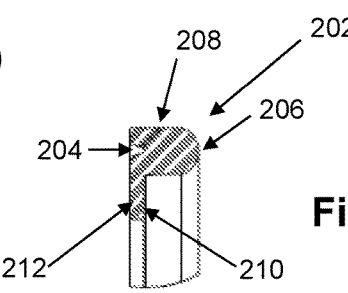
Fig. 22
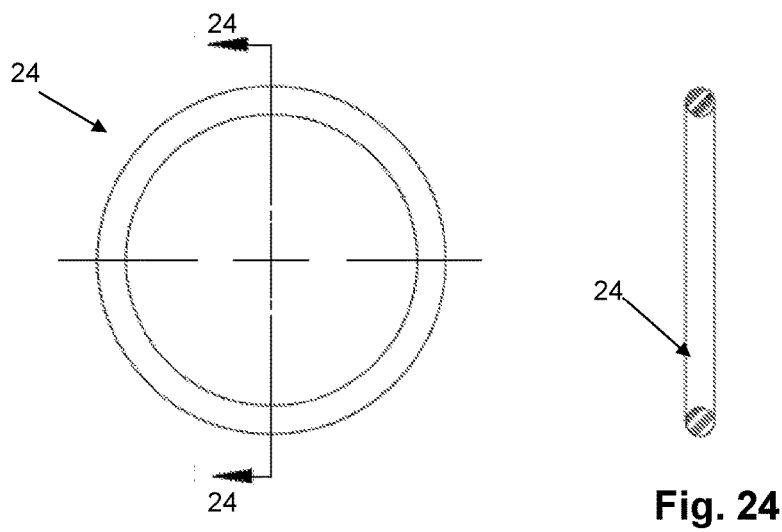
Fig. 23
Fig. 24

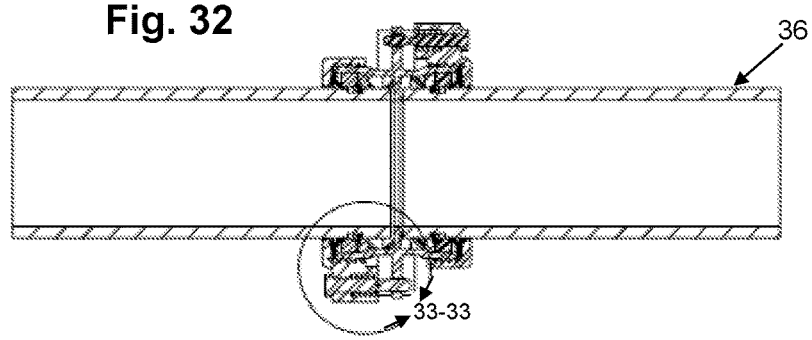
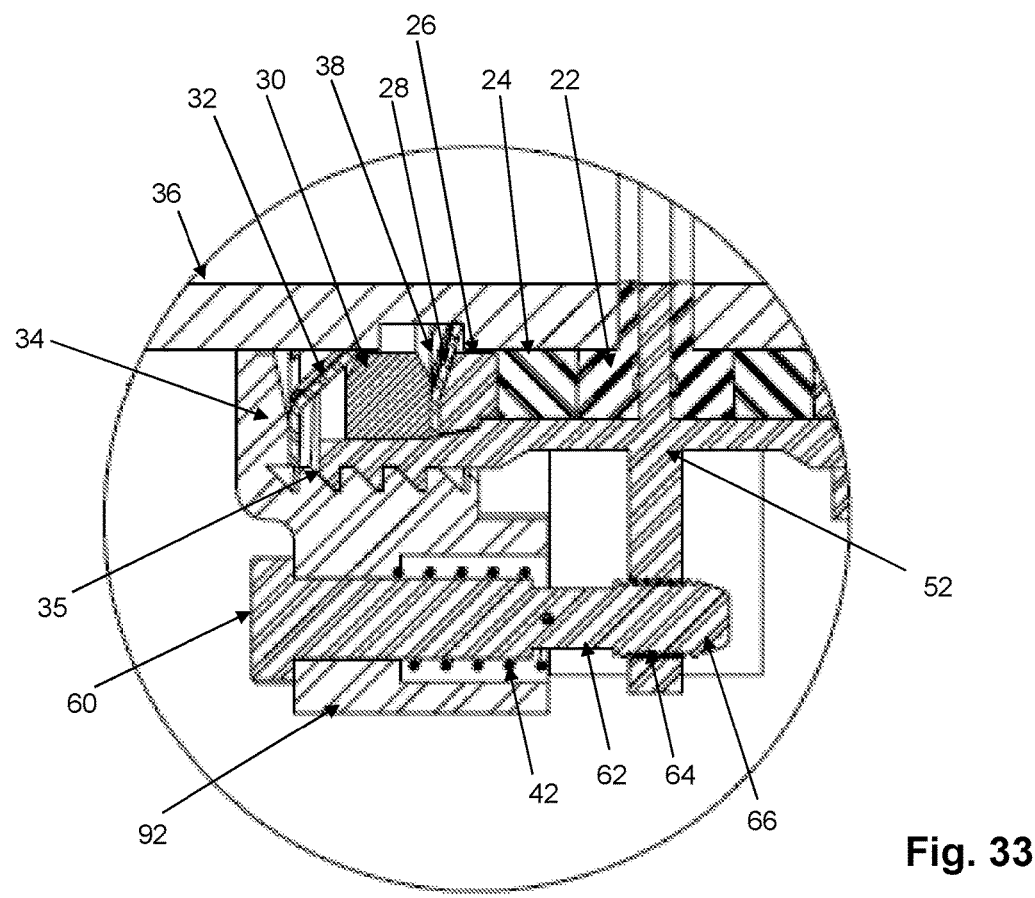

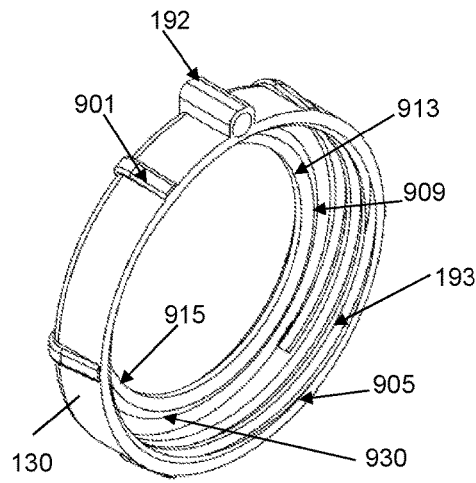
Fig. 42
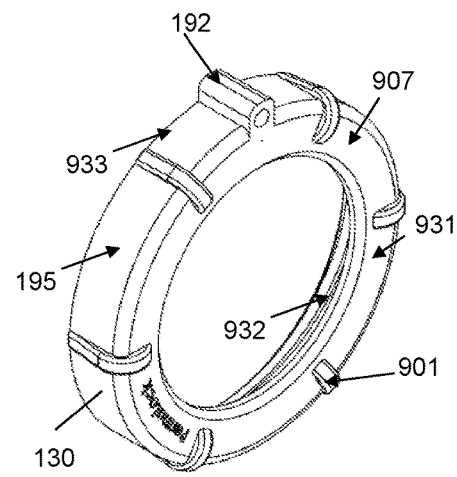
Fig. 43
Fig. 44
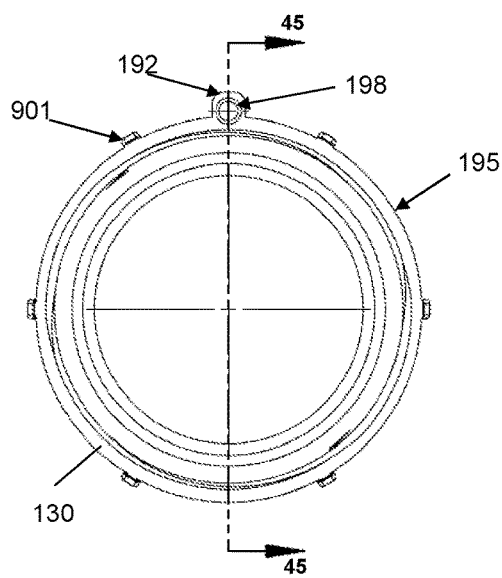
Fig. 45
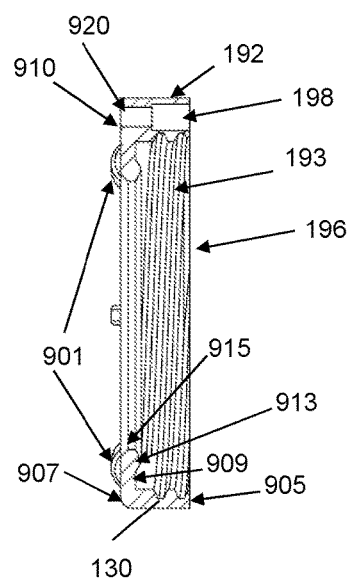

Fig. 46
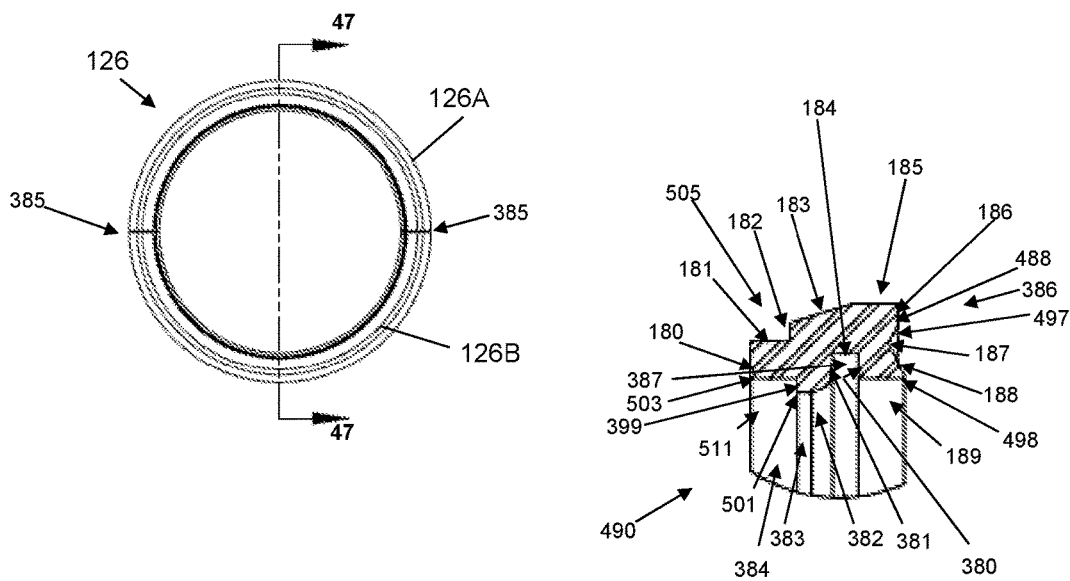
Fig. 48
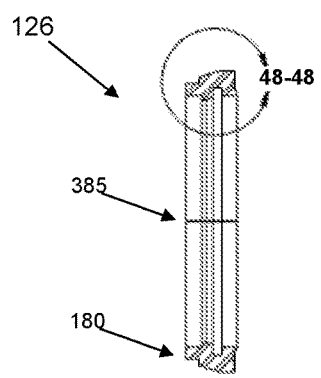
Fig. 47

LOCKING PIPE JOINT ASSEMBLY, DEVICE AND METHOD

FIELD

The present disclosure relates generally to fluid flow systems, and more particularly to a locking push-fit joint packing arrangement, device and method for providing zero resistance to a piping element to be inserted or removed.

BACKGROUND

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride), iron, black iron, ductile iron, gray iron, HDPE (high density polyethylene) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fitting and involve far fewer materials than soldering. For example, one may only need the pipes, quick-connect fittings, a chamfer/deburring tool and tubing cutter in order to connect pipes using push-fit technology.

The steps involved in connecting piping systems using push-fit technology can be outlined as follows. First, the pipe is cut to the appropriate length and the end of the pipe is cleaned with the deburring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, BlueHawk™ CopperHead® and Push Connect® lines of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122, U.S. Pat. No. 8,480,134, U.S. Pat. No. 8,844,974, U.S. Pat. No. 8,844,981, U.S. Pat. No. 9,068,680, and U.S. Pat. No. 9,217,529, the disclosures of which are incorporated herein by reference in their entireties.

SUMMARY

The present invention provides, in part, a locking pipe joint assembly, device and method that provides a tight seal without damage to the fitting elements or the pipe, and with zero resistance to the pipe upon insertion or removal. The present invention connects piping using no clamps, solder or glues, while creating a leak-free seal at the connected joining area. Further, the present invention can join both like and unlike piping elements without coining or threading the elements into place.

The quick connection pipe joint assembly package provided according to embodiments of the present invention employs a center body connector, one or more sealing elements, such as a wiper seal and a sealing ring, a sealing ring retainer, a primary fastening ring, a retaining cap sleeve, a secondary fastening ring and retaining cap. According to various embodiments, the present invention employs a center body connector, one or more sealing elements, a sealing ring retainer (also called a packing gland) and a retaining cap, with no fastening rings. In various embodiments, the retaining cap includes an internal thread that mates with an external thread on one side of the center body connector, which allows the retaining cap to tighten the packing arrangement components around an inserted piping or tubing element, and in secure engagement with the interior of the center body connector.

BRIEF DESCRIPTION OF THE DRAWINGS

FIG. 5 shows a perspective view of a center body connector according to embodiments of the present invention.

FIG. 6 shows a right side view of the center body connector of FIG. 5.

FIG. 7 shows a cross-sectional view of the center body connector taken along line 7-7 of FIG. 6.

FIG. 8 shows an enlarged view of encircled portion 8-8 of FIG. 7.

FIG. 13 is a right side view of a sealing ring retainer according to embodiments of the present invention.

FIG. 14 is a cross-sectional view of the sealing ring retainer taken along line 14-14 of FIG. 13.

FIG. 15 is an enlarged view of encircled portion 15-15 of FIG. 14.

FIG. 16 is a right side view of a retaining cap sleeve according to embodiments of the present invention.

FIG. 17 is a cross-sectional view of the retaining cap sleeve taken along line 17-17 of FIG. 16.

FIG. 18 is an enlarged view of encircled portion 18-18 of FIG. 17.

FIG. 19 is a right side view of a bolt element according to embodiments of the present invention.

FIG. 20 is a right side view of a wiper seal according to embodiments of the present invention.

FIG. 21 is a cross-sectional view of the retaining cap sleeve taken along line 21-21 of FIG. 20.

FIG. 22 is an enlarged view of encircled portion 22-22 of FIG. 21.

FIG. 23 is a right side view of a sealing ring according to embodiments of the present invention.

FIG. 24 is a cross-sectional view of the sealing ring taken along line 24-24 of FIG. 23.

FIG. 32 shows a front cross-sectional view of the embodiment of the present invention of FIG. 1 with a packing arrangement installed and tightened.

FIG. 33 is an enlarged view of encircled portion 33-33 of FIG. 32.

FIG. 42 is a front right perspective view of a retaining cap according to embodiments of the present invention.

FIG. 43 is a rear right perspective view of the retaining cap of FIG. 42.

FIG. 44 is a right side view of the retaining cap of FIG. 42.

FIG. 45 is a cross-sectional view of the retaining cap taken along line 45-45 of FIG. 44.

FIG. 46 is a right side view of a sealing ring retainer according to embodiments of the present invention.

FIG. 47 is a cross-sectional view of the sealing ring retainer taken along line 47-47 of FIG. 46.

FIG. 48 is an enlarged view of encircled portion 48-48 of FIG. 47.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

As shown in FIGS. 1 through 50, embodiments of the present invention provide a locking pipe joint assembly, device and method that facilitate connection and disconnection of piping elements with zero resistance.

Figure 1:
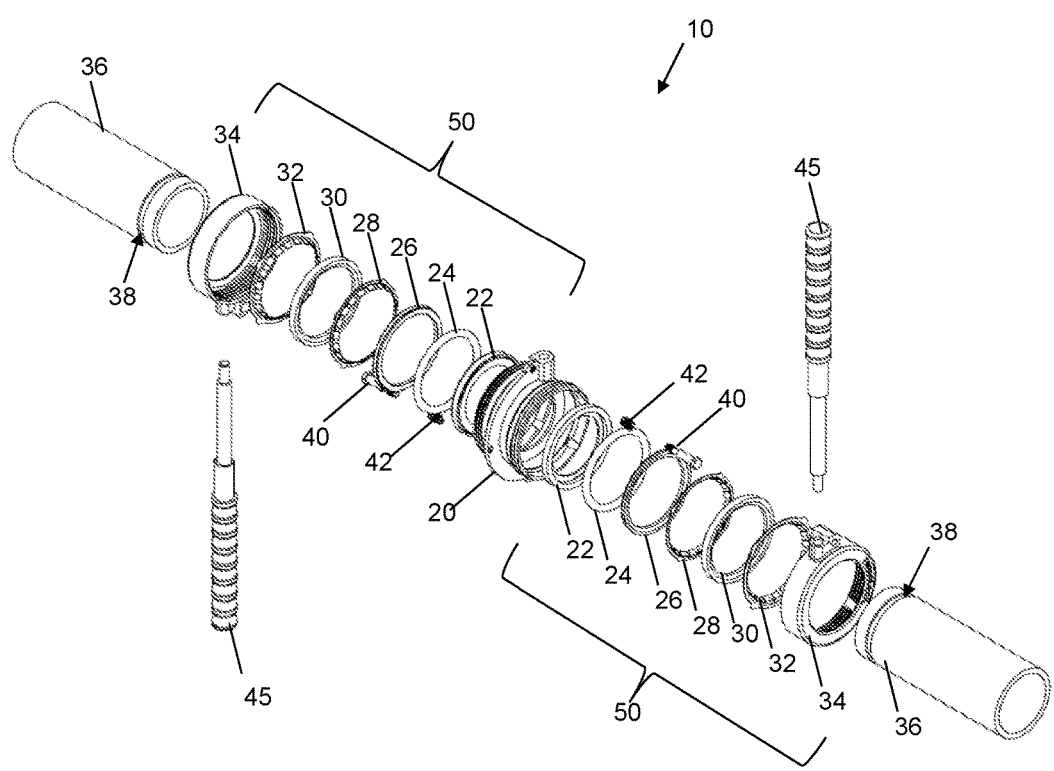
FIG. 1 shows an exploded perspective view of a device in accordance with embodiments of the present invention.
Figure 2:
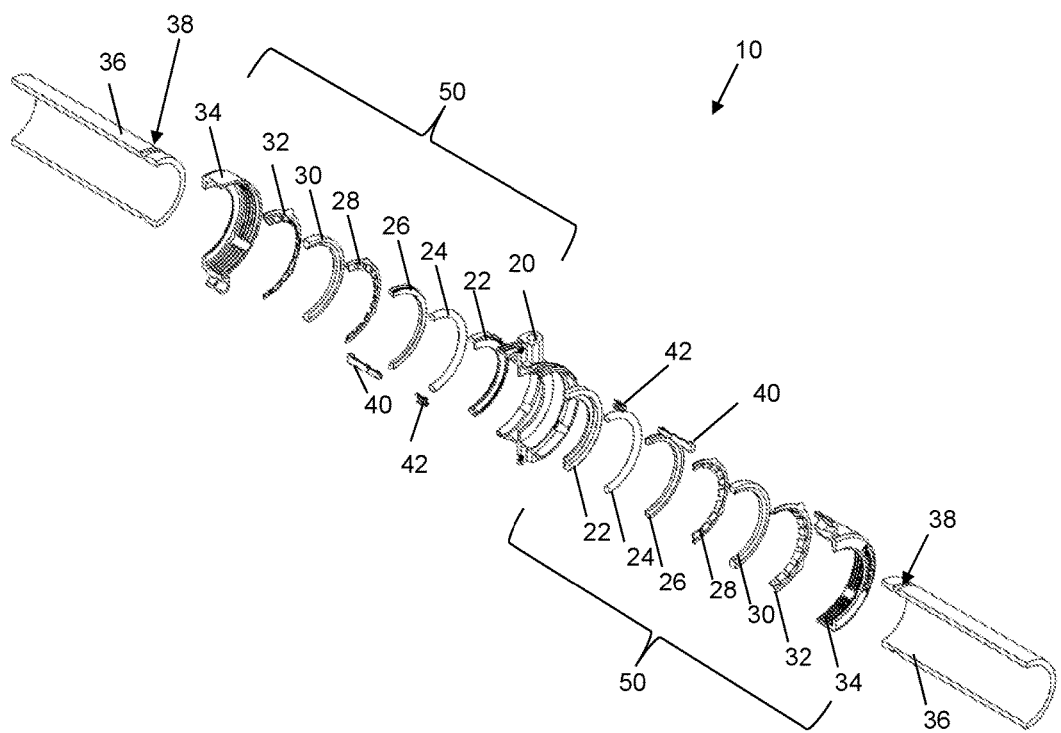
FIG. 2 shows an exploded cross-sectional view of the device of FIG. 1.

As shown, for example, in FIGS. 1 and 2, embodiments of the device 10 include a center body connector 20 and a packing arrangement 50 that, when combined yet not tightened, form a cavity for the zero resistance insertion of one or more piping or tubing elements 36. Once a pipe is inserted, the packing arrangement 50 can be tightened against the body connector 20 to provide a leak-free seal.

Figure 3A:
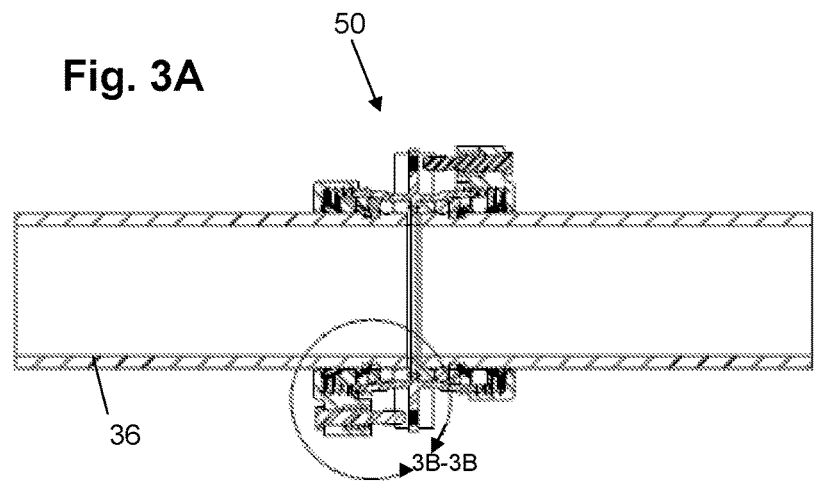
FIG. 3A shows a front cross-sectional view of the embodiment of the present invention of FIG. 1 with a packing arrangement installed but untightened.
Figure 3B:
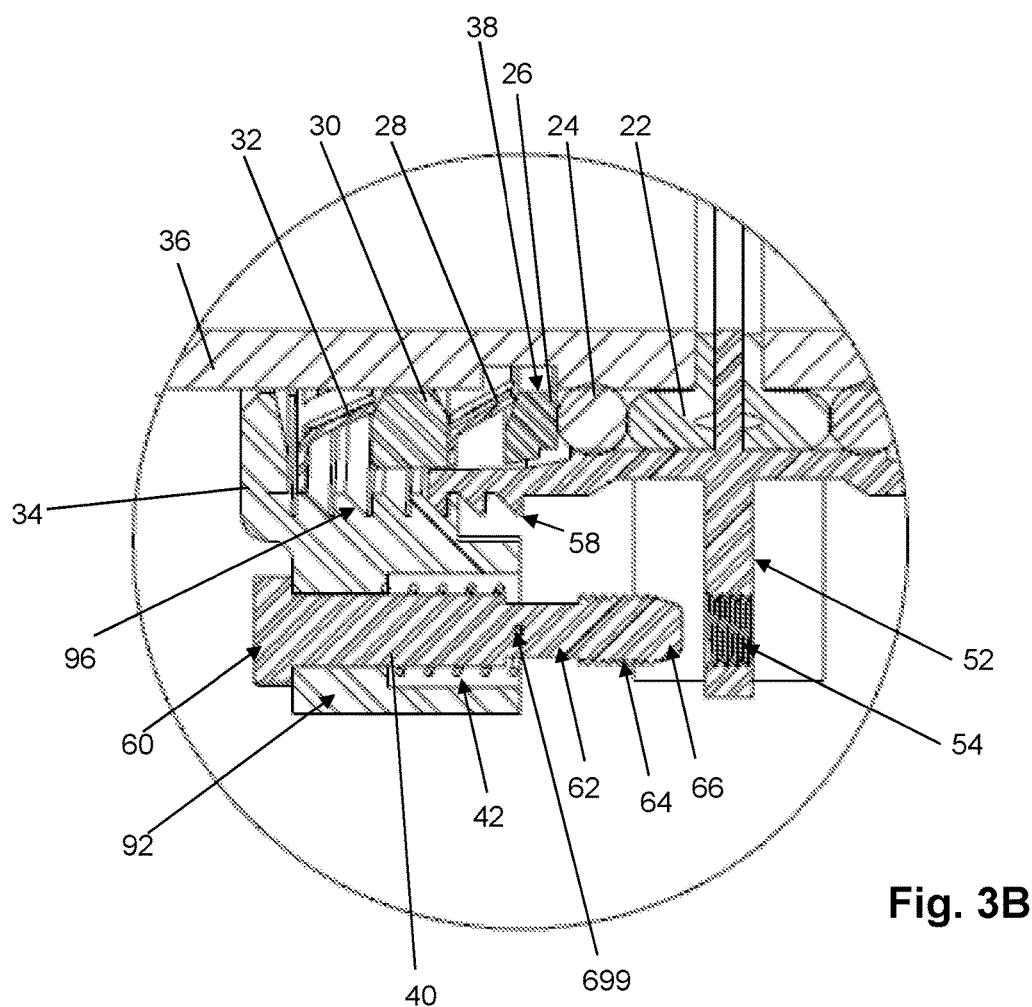
FIG. 3B is an enlarged view of encircled portion 3B-3B of FIG. 3A.
Figure 4A:
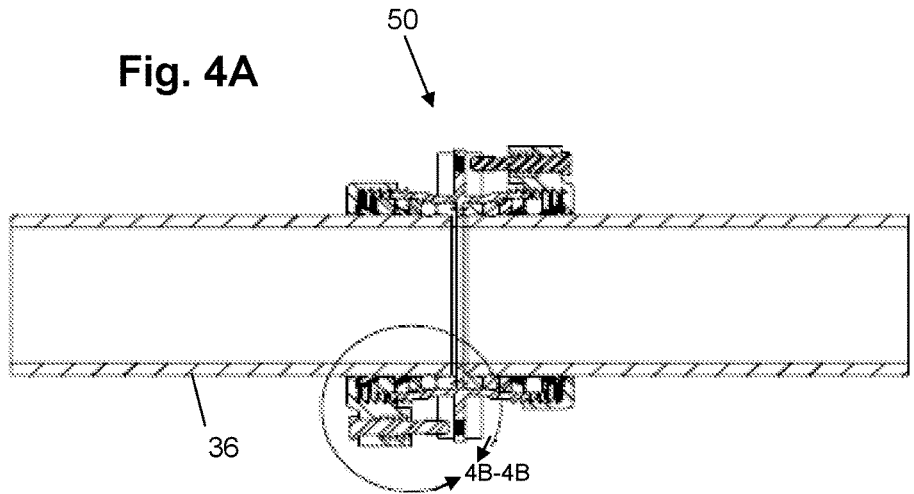
FIG. 4A shows a front cross-sectional view of another embodiment of the present invention with a packing arrangement installed but untightened.
Figure 4B:
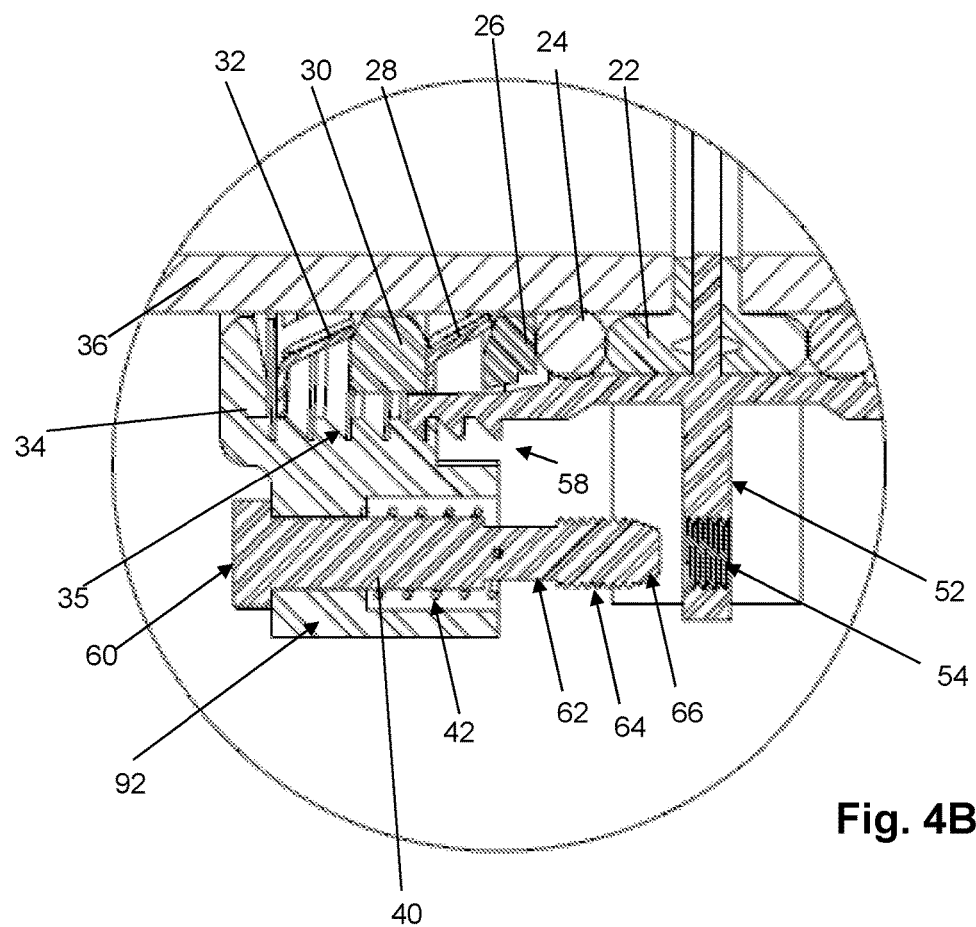
FIG. 4B is an enlarged view of encircled portion 4B-4B of FIG. 4A.
Figure 34:
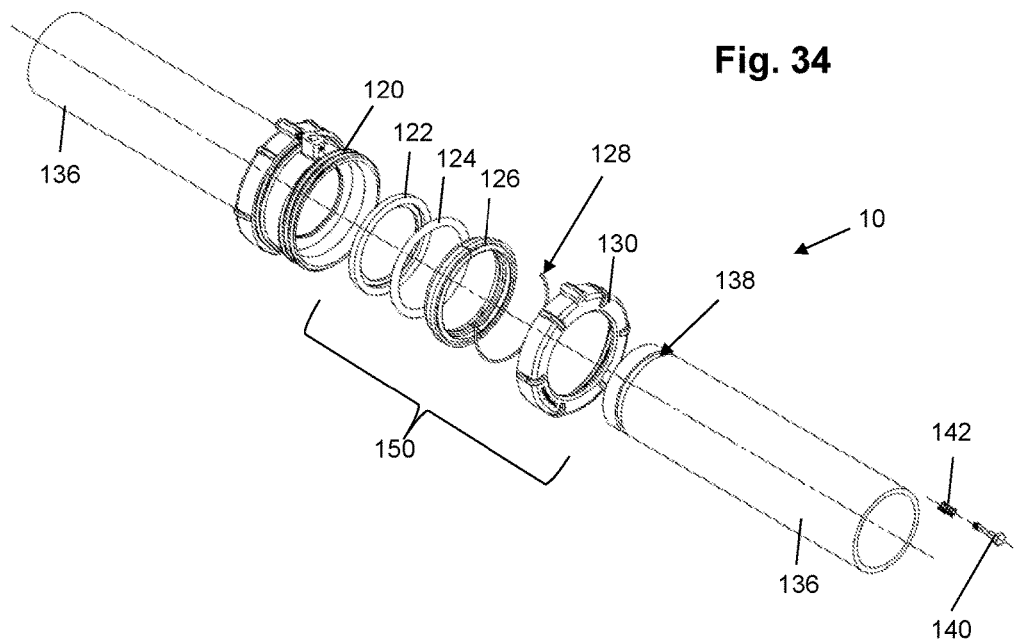
FIG. 34 shows an exploded perspective view of a device in accordance with embodiments of the present invention.
Figure 35:
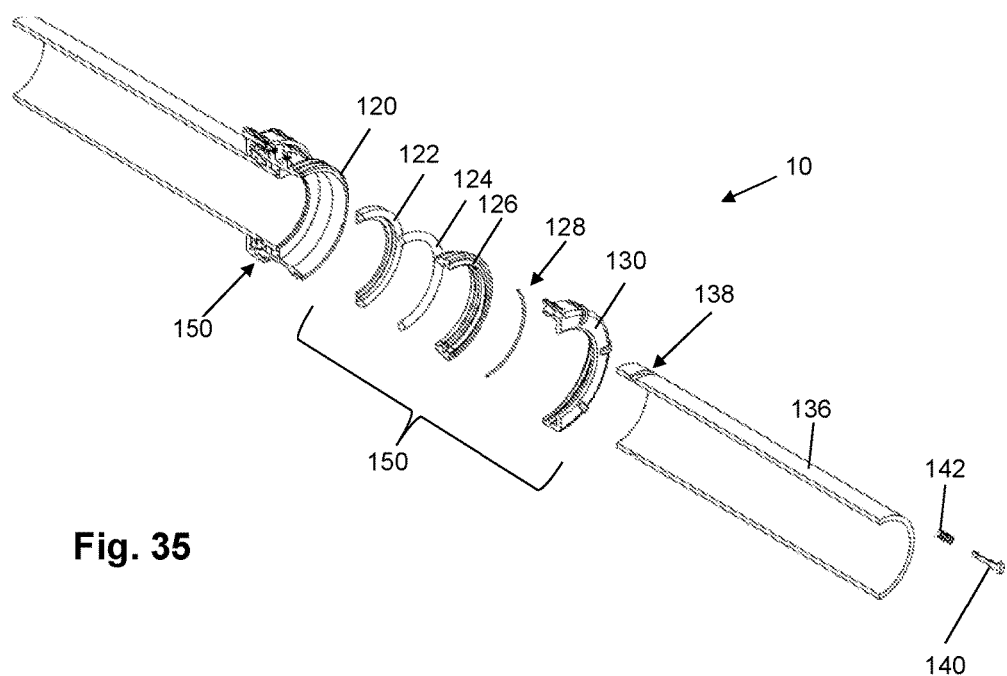
FIG. 35 shows an exploded cross-sectional view of the device of FIG. 34.
Figure 36:
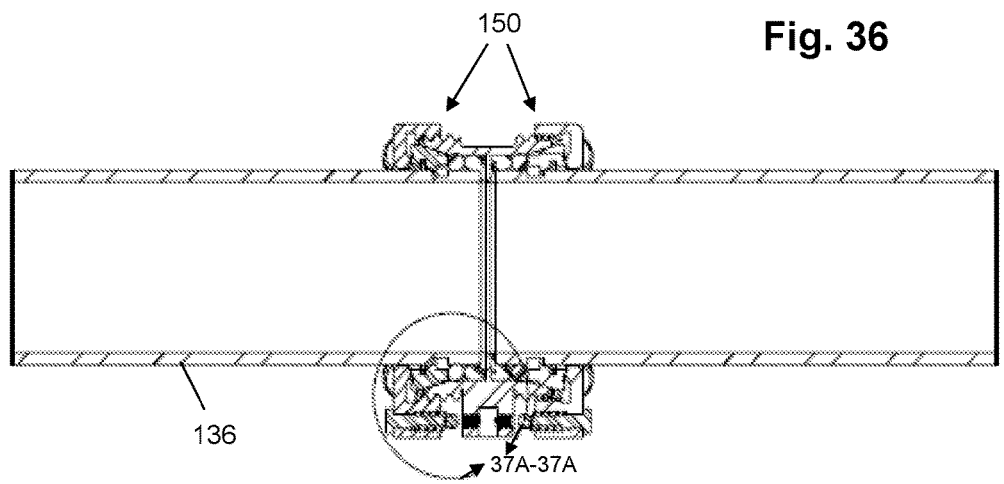
FIG. 36 shows a front cross-sectional view of the embodiment of the present invention of FIG. 34 with a packing arrangement installed but untightened.

In various embodiments, as shown in FIGS. 1-4B and 32-33, the packing arrangement 50 can include one or more of the following components: a center body connector 20, a wiper seal 22, a sealing ring 24, a sealing ring retainer 26, a primary fastening ring 28, a retaining cap sleeve 30, a secondary fastening ring 32 and a retaining cap 34. In FIGS. 3A and 3B, the piping element 36 includes an annular groove and/or notch ring 38. FIGS. 4A and 4B show a grooveless piping element 36. In FIGS. 34 through 35, no fastening rings and no retaining cap sleeve are employed.

As shown in FIGS. 5 through 8, the center body connector 20 includes a center portion 21 with pipe receiving portions 101 on either side of the center portion 21. The center body connector 20 includes a radially outer surface 23, an axial end wall surface 49, and a radially interior surface 71 forming a cavity 73 extending axially through the body connector along an axis 100. An inner flange 77 is integrally formed with and is part of the center body connector 20, and acts as a tube stop for stopping inserted tubes and/or pipes (e.g., pipe 36). The inner flange 77 extends radially inwardly from the interior surface 71 at the axially inner portion 70 of center body connector 20. An outer block or flange 52 is also integrally formed with and is part of the center body connector 20, and extends radially outwardly from the outer surface 23 at the axially inner portion 70 of center body connector 20. Flange 77 is typically located between pipe receiving portions 101, and extends radially inwardly towards the longitudinal axis 100, resulting in an internal radius from the longitudinal axis 100 to the tube stop flange 77 of $R_0$. In some embodiments, $R_0$ is substantially equivalent to the internal radius of the piping element(s) 36 being connected, thereby enabling a seamless connection between the pipe(s) 36 from the perspective of fluids, etc., traveling within pipe(s) 36. In various embodiments, the center body connector can be formed (e.g., forged, cast, extruded, pressed) in brass, aluminum, steel, malleable iron, plastic or copper, for example, with full porting and full flow. Such forming can be by hydroforming, hydro-molding, compression forming, vacuum forming, pressure forming, tube forming, die casting, sand casting, investment casting, wax casting and other established forming methods, for example. Forming can be an alternative method to metal die stamping, for example.

In various embodiments, as shown in FIGS. 5 through 8, for example, the flange 77 has a first side interior wall surface 77A and a second side interior wall surface 77B. At least a first pipe receiving portion of the body connector interior surface 71 extends from the first side interior wall surface 77A of the flange 77 to the axial end wall surface 49 and forms first 70, second 72 and third 74 compartments of increasing radial distance from the axis 100. In some embodiments, the interior radius of the pipe receiving portions 101 may vary at different points along the longitudinal axis 100. This varying radius facilitates the receipt of different parts in, for example, packing arrangement 50. More specifically, as shown for example in FIGS. 7-8, axially outer portion 74 is associated with a first radius R1, and axially inner portion 70 is associated with a second radius R2. There may also be an axial mid-portion 72 between axially inner portion 70 and axially outer portion 74. The axial mid-portion 72 may have a radius that varies along the longitudinal axis 100, such that the radius of the axial mid-portion 72 varies from R1 at its axially outermost point 19 to a radius that is greater than R2 but less than R1 at its axially innermost point 17, and further optionally including a radially extending notch 76 at the axially innermost point 17 between the axially inner portion 70 and the axial mid-portion 72. The notch 76 can assist in providing a stable stopping surface for inserted components of the packing arrangement 50.

In the embodiment shown in FIG. 7, the first compartment 70 has a substantially constant radial distance R2 from the axis 100 and is positioned at an axially inner portion of the body connector 20, the third compartment 74 has a substantially constant radial distance R1 from the axis 100, and R1 is larger than the radial distance R2 of the first compartment. The third compartment 74 is also positioned at an axially outer portion of the body connector 20. As further shown in the embodiment of FIG. 7, the second compartment 72 extends from the first compartment 70 to the third compartment 74 and has a radial distance that increases from the first compartment 70 to the third compartment 74.

As shown in FIGS. 5, 7 and 8, the body connector outer surface 23 includes a thread 58 extending therealong at one or both pipe receiving portions 101. The thread(s) 58 can be configured to mate with corresponding threaded portions 96 in retaining cap 34 (see, e.g., FIGS. 9-12). It will be appreciated that the thread can be provided on the body connector interior surface in various embodiments of the present invention, wherein such thread can then mate with threaded portions on the exterior surface of the retaining cap.

As shown further in FIGS. 5 through 8, the center body connector 20 may also include a block or flange 52 integrally formed with connector 20 and extending at least partially around the outer surface 23 of the connector 20. The flange 52 provides a surface from which to provide pin receiver 735 and bolt receiving portion 55 as described hereinafter. The pin receiver 735 can extend substantially transverse to the bolt receiving portion 55, according to aspects of the present invention. In various embodiments, the flange 52 extends approximately 180 degrees around the outer surface 23 of the connector 20, as shown in FIG. 6, for example. The internally threaded bolt receiving portion 55 can be provided with internal thread 54 (e.g., FIG. 3B) for receiving one or more bolt elements (e.g. bolt element 40, also shown in FIG. 19) that may be included in retaining cap 34. Center body connector 20 may also include one or more cavities 57 configured to receive corresponding ear members 410 in primary fastening ring 28 (see, e.g., FIG. 27), which facilitates a secure retention of fastening ring 28 so that it does not rotate or become inclined to rotate during operation of embodiments of the present invention.

Figure 9:
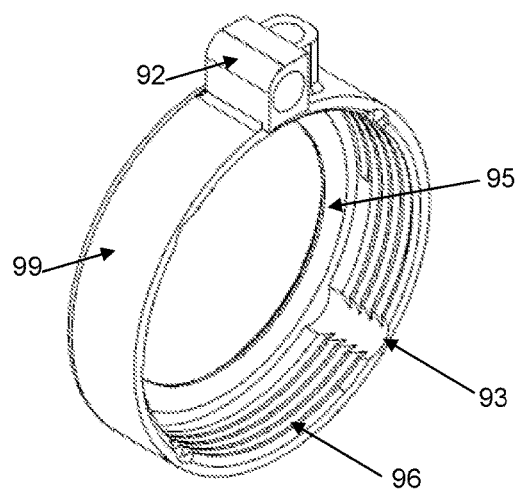
FIG. 9 is a front right perspective view of a retaining cap according to embodiments of the present invention.
Figure 10:
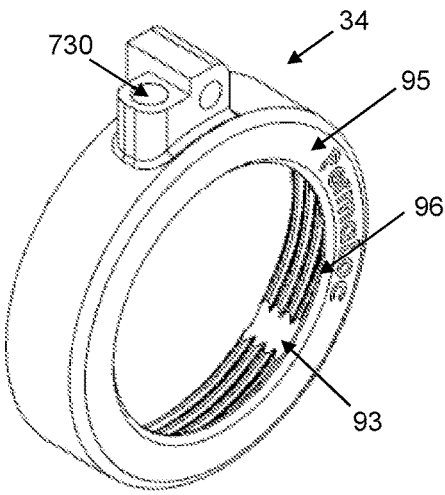
FIG. 10 is a rear right perspective view of the retaining cap of FIG. 9.
Figure 11:
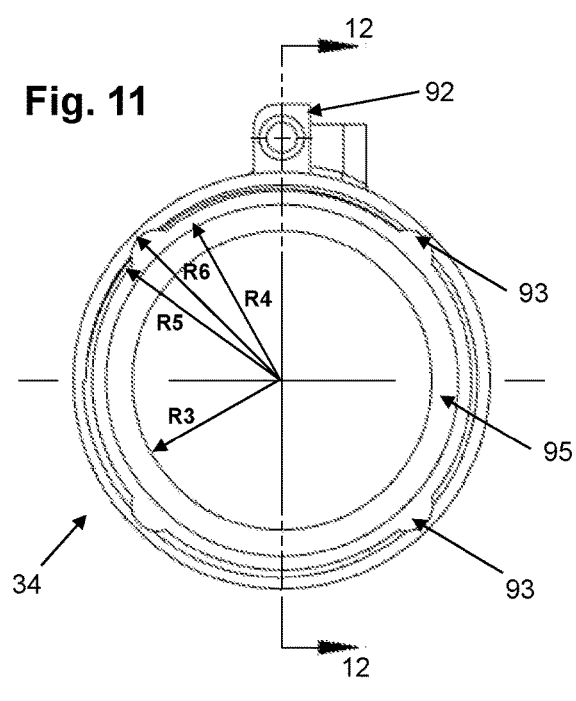
FIG. 11 is a right side view of the retaining cap of FIG. 9.
Figure 12:
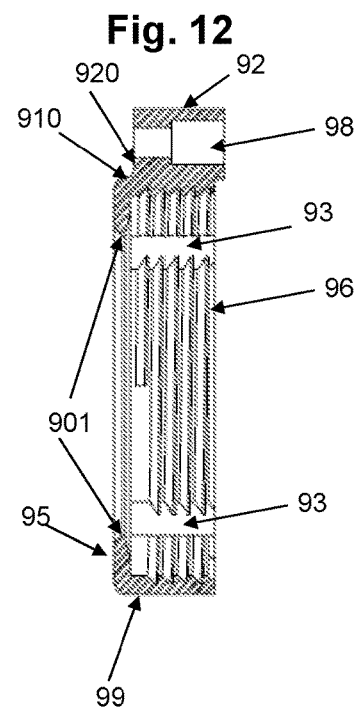
FIG. 12 is a cross-sectional view of the retaining cap taken along line 12-12 of FIG. 11.
Figure 25:
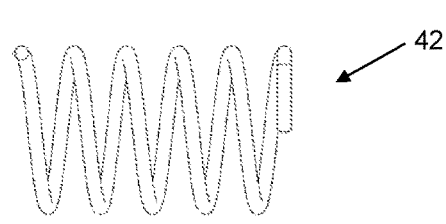
FIGS. 25 and 26 are front and right side views, respectively, of a spring according to embodiments of the present invention.
Figure 26:
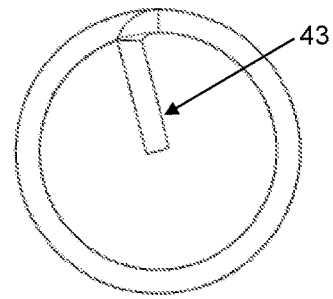

As shown in FIGS. 9 through 12, the retaining cap 34 is provided with a bolt retaining block 92 having a bolt retaining cavity 98. The retaining cap 34 can also include a radially outer wall 99 and an axially outer wall 95. Axially outer wall 95 can also include pointed inner rim 901 pointing radially inward. In various embodiments, bolt retaining block 92 can be set back from the axially outer wall 95 so as to provide a gap 910 between the bolt retaining block 92 and the axially outer wall 95, the gap being, in some embodiments, substantially equal to or greater than the thickness of bolt head 60, as described elsewhere herein. Bolt retaining block 92 is also configured to extend sufficiently far above the retaining cap 34 such that there is a gap 920 between the radially outer wall 99 and bolt retaining cavity 98 thereby ensuring enough clearance for bolt head 60. Referring to FIG. 9, the retaining cap 34 may include an opening in the axially outer wall 95 for allowing a pipe (e.g., pipe 36) to pass through, wherein the radius from the longitudinal axis to the axially outer wall 95 is R3. The retaining cap can also include internal threads 96 on the inside of radially outer wall 99 that are configured to mate with threads 58 in the center body connector 20. As described above, alternative embodiments of the invention can incorporate threads on the outside of wall 99 to mate with threads on the interior surface of the center body connector. Referring still to FIGS. 9 through 12, the internal threads 96 have a top portion and a bottom portion, wherein the radius from the longitudinal axis to the top portion is R4 and the radius from the longitudinal axis to the bottom portion is R5. The retaining cap may also include cavities 93 for receiving ear members 610 from secondary fastening ring 32 (see, e.g., FIG. 29), which facilitates a secure retention of fastening ring 32 so that it does not rotate or become inclined to rotate during operation of embodiments of the present invention. The radius from the longitudinal axis to the valley of the cavities 93 is R6. In various embodiments, and similar to the center body connector 20, the retaining cap 34 can be forged or formed in brass, aluminum, steel, malleable iron, copper, other metallic material or non-metallic material, for example.

The wiper seal 22 can be used to help seal the pipe (e.g., pipe 36) connection once tightened. As shown in FIGS. 20 through 22, the wiper seal 22 can include an inner wall 200 and a protruded rim 202, wherein the protruded rim 202 can include a gap 204 in the back side to permit flexibility and compression. The protruded rim 202 can also include a rounded sealing ring compression portion 206 for receiving and compressing with the sealing ring 24 (see, e.g., FIGS. 23-24) and can also include a substantially flat top portion 208 configured to be positioned substantially flush with axially inner portion 70 of inner wall 75 of the center body connector 20. Wiper seal 22 can also include a pipe compression portion 210 extending radially inward from protruded rim 202, wherein the radius from the longitudinal axis to the most radially inward point of the wiper seal 22 is R7. Wiper seal 22 can further include a back portion 212 configured to be positioned substantially flush against tube stop flange 77 of center body connector 20 during operation.

FIGS. 23 through 24 illustrate certain embodiments of sealing member 24. The outer diameter of sealing member 24 is substantially the same as the axially inner portion 70 of the center body connector 20 (R2). It will be appreciated by those having skill in the art that sealing member 24 may comprise a flat ring or washer-type seal member in addition to or as an alternative to a circular member of substantially circular cross-section, as shown in FIGS. 23-24. Indeed, in the exemplary embodiments shown in FIGS. 23-24, sealing member 24 comprises a substantially circular cross-section. In various embodiments, the sealing elements (e.g., wiper seal 22 and sealing member 24) can be formed from a rubber or similar compressible material and can be lubricated with a food grade lubricant, for example. In various embodiments, the wiper seal 22 and the sealing member 24 can be integrated and formed as a single, unitary monolithic sealing element having a substantially similar shape and geometry to the combined individual elements 22 and 24 shown in FIGS. 20 through 24.

FIGS. 13 through 15 illustrate an exemplary embodiment of sealing ring retainer 26 which is configured to retain sealing member 24 and wiper seal 22. As its geometry suggests, sealing ring retainer 26 can be configured to fit within center body connector 20 substantially at the point where the axially inner portion 70 transitions to the axial mid-portion 72, thereby also aligning with notch 76. In particular, sealing ring retainer 26 can include an outermost perimeter 302 on its axially outward side, an intermediate perimeter 304 on its axially inward side, and a radially inward perimeter 306. The sealing ring retainer 26 also includes an outer portion 310 that substantially aligns with the axially inward portion 70 of center body connector 20 (namely, radius R2); notch 76; and at least a portion of the axial mid-portion 72 such that the sealing ring retainer 26 has a varying radius aligning with a corresponding portion in axial mid-portion 72. More specifically, an axially inward portion 310 of sealing ring retainer 26 can include a radius substantially equal to R2. Sealing ring retainer 26 can also include a stop notch 312 configured to catch notch 76 of center body connector 20. Further still, sealing ring retainer 26 can include an axially outward portion 314 configured to align substantially with axial mid-portion 72. Sealing retainer ring 26 can also include axially inward face 316 and axially outward face 318. Axially outward face 318 can also include sloped portion 320 which slopes generally axially and radially inward to an inner perimeter 322. Sloped portion 320 can serve as a guide for teeth 414 of primary fasting ring 28 to ensure the teeth 414 engage the pipe (e.g., piping element 36) appropriately, as described elsewhere herein. In various embodiments, the sealing ring retainer 26 can be formed from a steel, stainless steel, hardened steel, brass or similar metallic material as well as a non-metallic material, for example.

Figure 27:
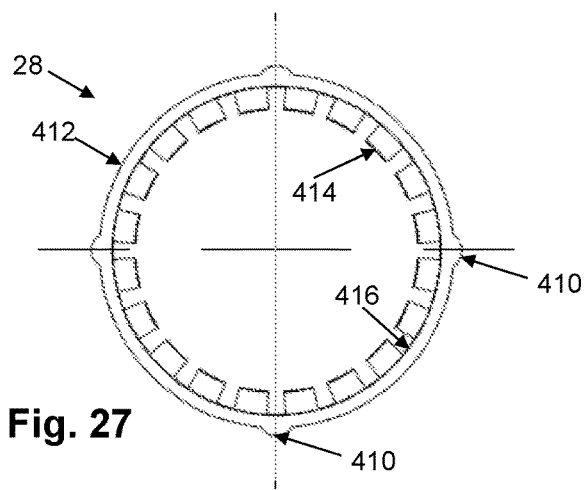
FIGS. 27 and 28 are right side and front views, respectively, of a primary fastening ring according to embodiments of the present invention.
Figure 28:
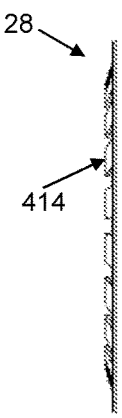

As shown in FIGS. 27 through 28, the primary fastening ring 28 can include ear members 410 extending from an outer circumference 412. Ear members 410 can be configured to fit within cavities 57 of center body connector 20. The ear members 410, when inserted in cavities 57 of center body connector 20 to prevent rotation of primary fastening ring 28 within the center body connector 20. Primary fastening ring 28 can also include teeth 414 extending from inner circumference 416. Teeth 414 can be configured to fit within and catch a notch ring 38 on the pipe (e.g., piping element 36) for holding the piping element in place.

As shown in FIGS. 16 through 18, the retaining cap sleeve 30 can include an inner perimeter 502 and an outer perimeter 504. The retaining cap sleeve 30 can also include a radially outward face 506 that includes outer perimeter 504; a radially inward face 508 that includes the inner perimeter 502; an axially inward face 510; and an axially outward face 512. The axially inward face 510 and axially outward face 512 extend radially inward from the outer perimeter 504 to a point between the outer perimeter 504 and the inner perimeter 502 (e.g., a point about midway between the outer perimeter 504 and inner perimeter 502). From there, the axially inward face 510 and axially outward face 512 begin to taper toward one another until reaching the radially inward face 508, thereby forming tapered surfaces 514, 516, according to various embodiments. Accordingly, the cross section of retaining cap sleeve 30 can be substantially hexagonal, the radially inward face 508 spanning an axial distance less than that of the axial distance spanned by the radially outward face 506. The axially outward tapered surface 516, much like sloped portion 320 of the sealing ring retainer 26 (e.g., FIG. 14), can serve to guide teeth 630 of a secondary fastening ring 32 toward the piping element 36, as described elsewhere herein. In various embodiments, the retaining cap sleeve 30 can be formed from a iron, steel, stainless steel, hardened steel, brass or similar metallic material as well as a non-metallic material, for example.

Figure 29:
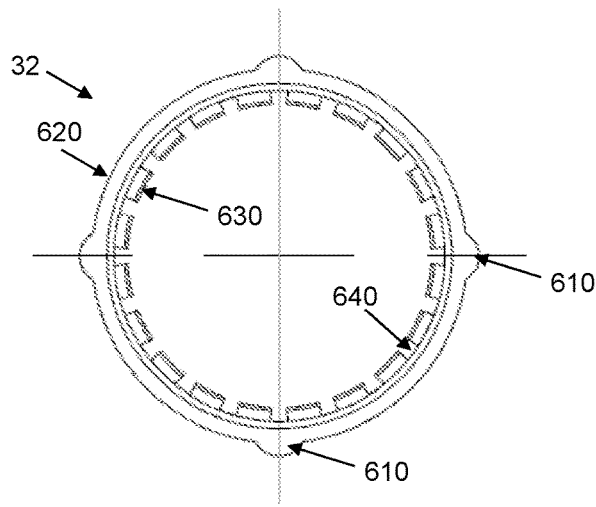
FIGS. 29 and 30 are right side and front views, respectively, of a secondary fastening ring according to embodiments of the present invention.
Figure 30:
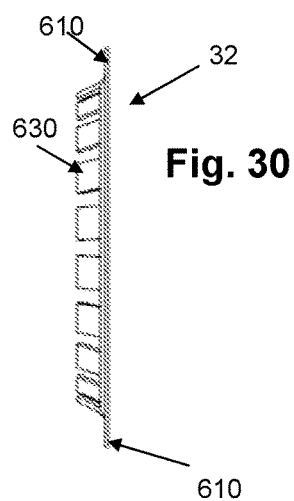
Figure 31:
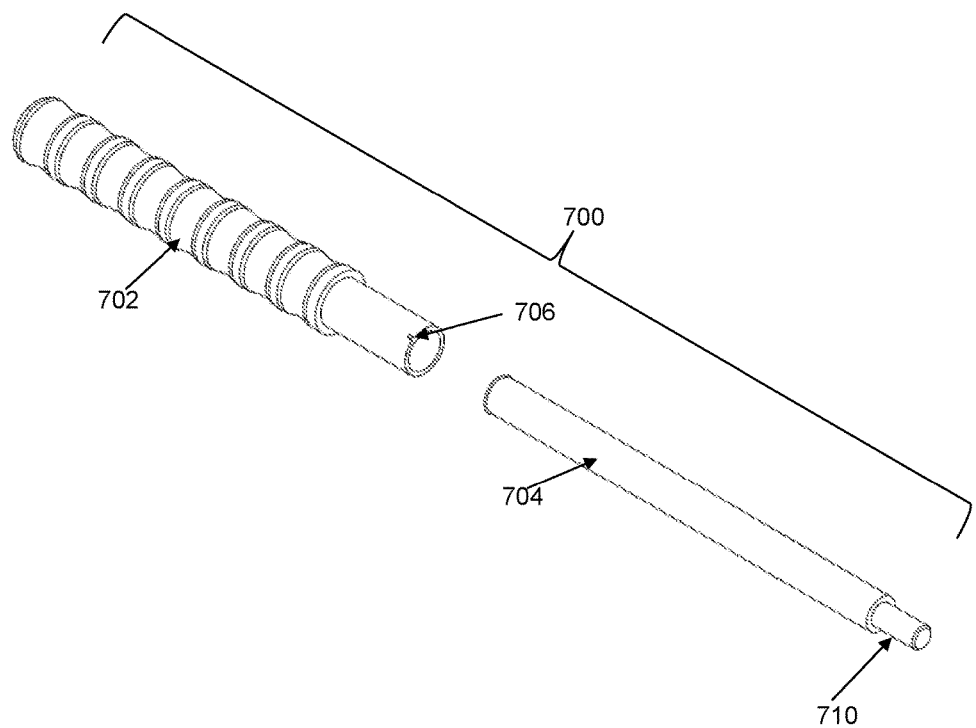
FIG. 31 is a perspective view of an actuating pin according to embodiments of the present invention.

As shown in FIGS. 29 through 30, the secondary fastening ring 32 may include features substantially similar to, but distinguishable from, those of the primary fastening ring 28. For example, secondary fastening ring 32 may include ear members 610 extending from an outer circumference 620. The ear members 610, similar to ear members 110 on the primary fastening ring 28, may be configured to feed into cavities 93 in retaining cap 34 to prevent rotation of secondary fastening ring 32. Secondary fastening ring 32 may also include teeth 630 extending from an inner circumference 640. Teeth 630 may be configured to engage with, for example, a portion of pipe (e.g., pipe 36) inserted into the device 10. Teeth 630 may also engage with, and be directed into proper position by, outward tapered surface 516 of retaining cap sleeve 30. In various embodiments, the fastening rings 28 and 32 can comprise a spring steel formulation, for example, that enables the fastening rings to be malformed during installation, while springing back into their originally manufactured position once installed. The rings 28 and 32 can also comprise other metallic and non-metallic alternatives.

The internal thread 96 in retaining cap 34 can be configured to mate with external thread 58 in center body connector 20. Alternatively, the retaining cap thread can be on the outer surface of the retaining cap, and the center body connector thread can be on the interior surface of the center body connector. In various embodiments, the threads 96 and 58 are provided with a sufficient pitch to enable full threaded connection with a half-rotation turn of the retaining cap 34 upon the center body connector. In various embodiments, the rotation of the retaining cap can be accomplished through use of actuating pin 700 shown in FIG. 31. As shown therein, actuating pin 700 may include upper portion 702, lower portion 704, and tip 710. In some embodiments, upper portion 702 and lower portion 704 are optionally disconnected for ease of use and storage. An alignment notch 706 can be included to facilitate re-coupling of the upper and lower portions 702, 704. Further, tip 710 can be configured to fit into an actuating pin receiver 730 on retaining cap 34, and a similarly sized actuating pin receiver 735 on center body portion 20. In certain embodiments, actuating pin 700 and actuating pin receivers 730, 735 are configured such that the pin 700 can be locked into place and remain within receiver 730, 735 even in configurations where gravity would otherwise pull the pin 700 out of place. In operation, a user can insert a first actuating pin 700 into receiver 730, and a second actuating pin 700 into receiver 735. The actuating pins 700 can then be used by the user as gripping points to easily push/pull the pins and facilitate, for example, the required half-rotation turn needed to enable full threaded connection of the retaining cap 34, center body connector 20, and the packing arrangement 50 therein.

In operation, the center body connector 20 is provided, having wiper seal 22, sealing ring 24, and sealing ring retainer 26 installed therein. A user can then install retaining cap 34 onto one end of a pipe 36 to be connected. Retaining cap 34 has, in some embodiments, secondary fastening ring 32, retaining cap sleeve 30, and primary fastening ring 28 installed therein. The pipe 36 can then be inserted into one side of center body connector 20 with no resistance, and the packing arrangement can appear, for example, as shown in FIGS. 3A and 3B. As can be seen therein, sealing elements 22, 24 are not yet compressed, and fastening rings 28, 32 are not engaging the pipe 36. Once the retaining cap 34 and the components therein are tightened onto center body connector 20 (e.g., by threaded engagement of the retaining cap with the center body connector and further by securing a bolt to the center body connector 20), the packing arrangement 50 is compressed into place as shown in FIGS. 33 and 34. It will be appreciated that the axial compression force of rotating the retaining cap 34 translates into axial and radial compression of the packing arrangement 50 to create a tight seal. A similar procedure can be employed for the corresponding pipe 36 on the opposite side of connector 20. Once tightened, a leak proof, sealed connection is established. In the event a user desires to disconnect the coupled pipes 36, the process may simply be reversed, allowing for clean, easy access to the interior of the pipe 36. If desired, the pipes 36 could then be re-connected using the same procedure and parts.

As shown in FIGS. 1-3B, and 19, a bolt element 40 is provided and is capable of being installed within bolt retaining cavity 98 of retaining cap 34. Bolt element 40 can include bolt head 60, bolt main body 65, bolt body extension 62, bolt thread 64, bolt tip 66, and spring receiving hole 699 on bolt body extension 62. It will be appreciated that bolt element 40 can include a head with a flat groove or "Philips head" groove for assistance in screwing bolt element 40 into the bolt retaining cavity 98 as well as center body connector 20. Bolt thread 64 can be configured to match with thread portions 54 within bolt receiving portion 55 of center body connector 20. When the bolt element 40 is screwed into the bolt receiving portion 55 on the center body connector 20, the retaining cap 34 is prevented from rotating relative to the center body connector 20, thereby ensuring that the device and packing arrangement remains securely in place. For ease of use, in some embodiments, a spring 42 can be installed around bolt main body 65. Spring 42 is shown in greater detail in FIGS. 25-26. In some embodiments, spring 42 may include a radially inwardly extending tab 43 that may be configured to fit within spring receiving hole 699 on bolt element 40. The tab 43 enables the spring to transfer its energy to the bolt when compressed. When unscrewing bolt element 40 from bolt receiving portion 55, the tension in the compressed spring acts to pull the bolt element 40 out of the receiving portion 55 when the threads release, making it easier for the user to disassemble the device, if desired.

FIGS. 32 and 33 illustrate the retaining cap 34 being fully mated with the center body connector 20 through threaded engagement and bolt connection. As can be seen therein, sealing elements 22, 24 are compressed axially between the sealing ring retainer 26 and the flange 77 of the center body connector 20, and further compressed radially between the pipe 36 and the inner surface 70 of the center body connector 20. Further, fastening rings 28, 32 are engaging the pipe 36, whereby the primary fastening ring 28 is maintained within the notch 38 of the pipe. It will be appreciated that similar compression and secure connection can be employed in embodiments of the present invention addressing a piping element with no groove, as shown in FIGS. 4A and 4B, for example. As shown therein, the fastening rings 28 and 32 are engageable with the pipe 36, and the sealing ring retainer 26 applies axial pressure to the sealing elements 22, 24 when the cap 34 is secured to the center body connector 20.

In various other embodiments of the present invention, as shown, for example, in FIGS. 34 through 35, the device 10 includes a center body connector 120 and a packing arrangement 150 that, when combined yet not tightened, form a cavity for the zero resistance insertion of one or more piping or tubing elements 136. Such a packing arrangement 150 can be employed without the use of any fastening rings, in various embodiments. Once a pipe is inserted, the packing arrangement 150 can be tightened against the body connector 120 to provide a leak-free seal.

In various embodiments, as shown in FIGS. 34 through 50, the packing arrangement 150 can include one or more of the following components: a center body connector 120, sealing elements such as a wiper seal 122 and a sealing ring 124, a sealing ring retainer 126, a spring support band 128 and a retaining cap 130. FIGS. 34 through 37B show the piping element 136 including an annular groove 138, which is engaged and employed by the packing arrangement to facilitate operation of embodiments of the present invention as described herein. Nevertheless, it will be appreciated that the embodiments of the present invention as shown in FIGS. 34 through 50 are operable with piping elements having no such groove.

Figure 37A:
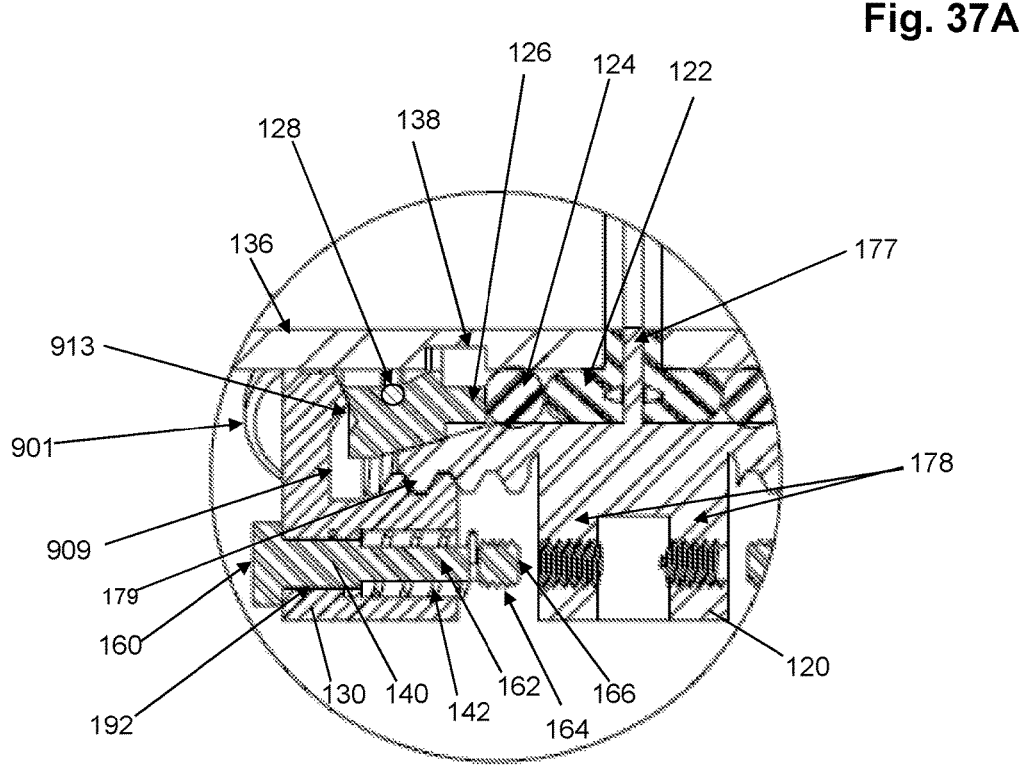
FIG. 37A is an enlarged view of encircled portion 37A-37A of FIG. 36.
Figure 37B:
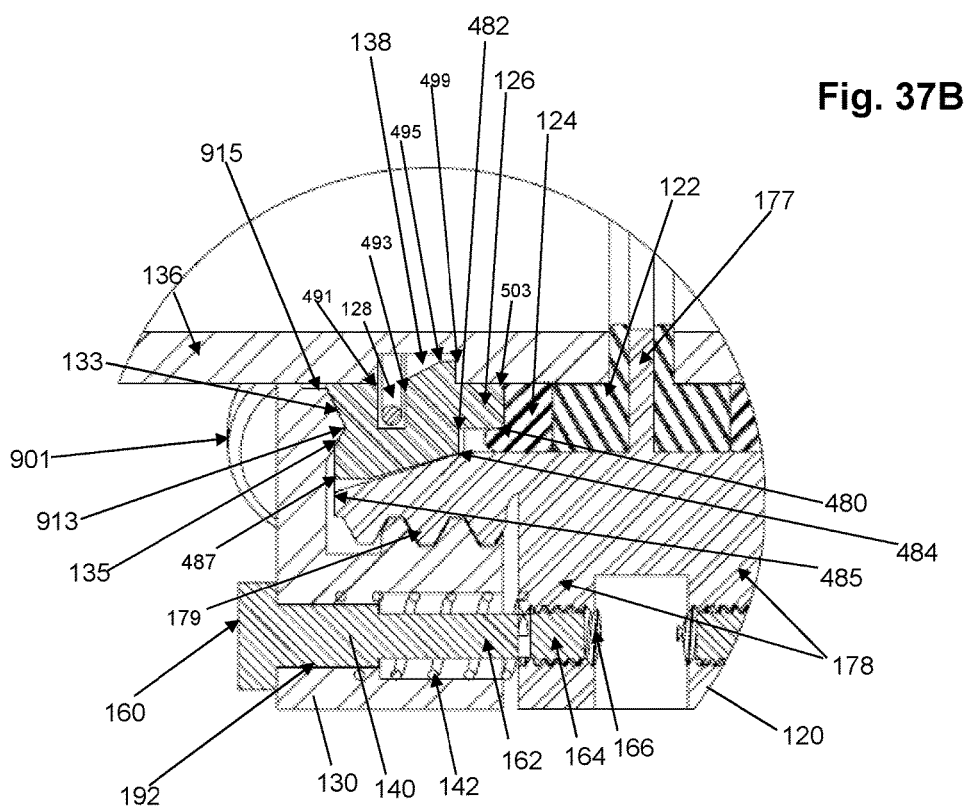
FIG. 37B is an enlarged view similar to FIG. 37A, with a packing arrangement installed and tightened.
Figure 38:
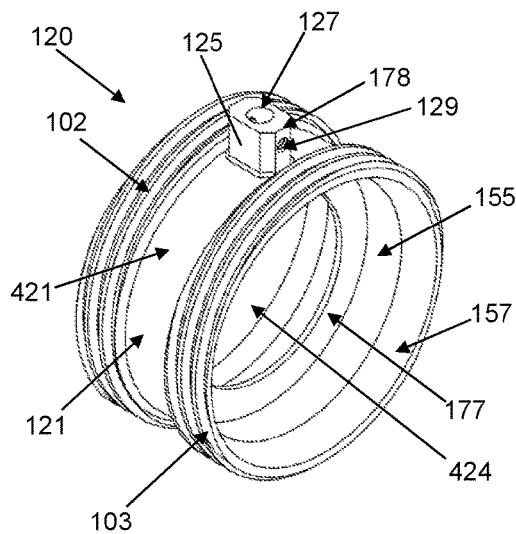
FIG. 38 shows a perspective view of a center body connector according to embodiments of the present invention.
Figure 39:
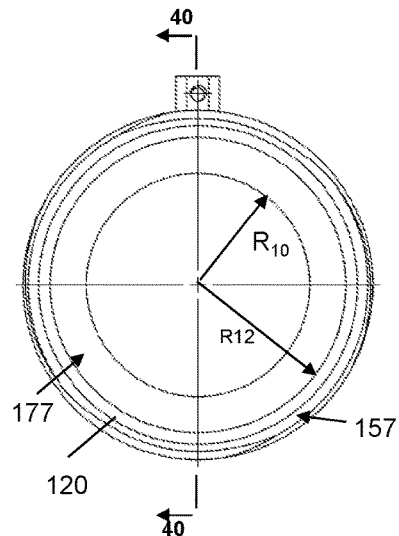
FIG. 39 shows a right side view of the center body connector of FIG. 38.
Figure 40:
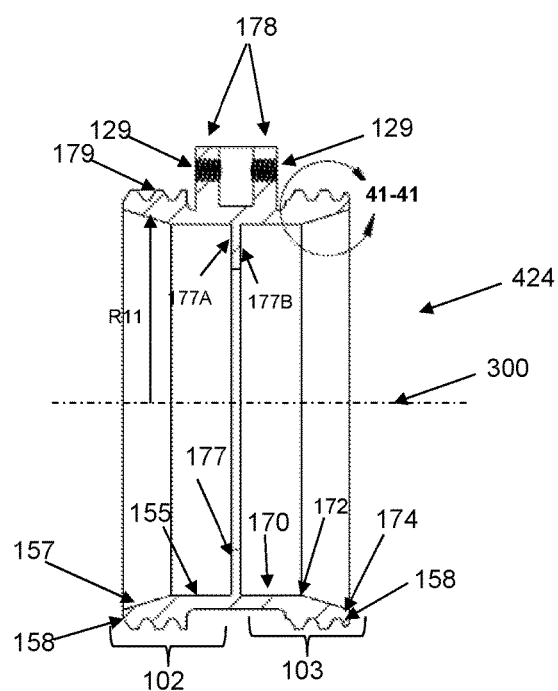
FIG. 40 shows a cross-sectional view of the center body connector taken along line 40-40 of FIG. 39.
Figure 41:
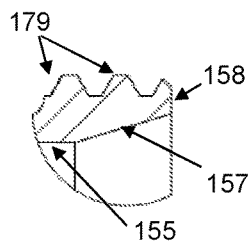
FIG. 41 shows an enlarged view of encircled portion 41-41 of FIG. 40.

In various embodiments as shown in FIG. 46, for example, the sealing ring retainer 126 is bifurcated into two substantially semi-circular pieces, 126A and 126B, joined at circumferential seams 385. The pieces 126A and 126B can be held together in mating end-to-end contact through a tight fit between the center body connector 120, the cap 130 and an inserted piping element 136, as shown in FIGS. 37A and 37B, and can further be held together through the insertion of the spring support band 128 into a groove 387 formed by inner walls 380, 381 and 184 of the sealing ring retainer 126, as shown in FIGS. 37A, 37B and 48, and as described elsewhere herein. In various embodiments, the sealing ring retainer 126 can comprise a single unitary body having a split formed therein. In various other embodiments, the sealing ring retainer 126 can comprise more than two bodies joined at circumferential seams, similar to seams 385 shared by the two bodies 126A and 126B in FIG. 46.

As shown in FIGS. 38 through 41, for example, center body connector 120 includes a center portion 121 with pipe receiving portions 102, 103 extending in opposite directions from respective sides of the center portion 121. The center body connector 20 includes a radially outer surface 421, axial end wall surfaces 158, and a radially interior surface 170 forming a cavity 424 extending axially through the body connector along an axis 300. In various embodiments, the radially outer surface 421 is substantially smooth at center portion 121, and includes thread(s) 179 at portions 102, 103 for receiving the cap member 130 as described elsewhere herein. In alternative embodiments, the thread(s) 179 can be provided on the interior surface 170 of the center body connector 120.

An inner flange 177 is integrally formed with and is part of the center body connector 120, and acts as a tube stop for stopping inserted tubes and/or pipes (e.g., pipe 136). The inner flange 177 extends radially inwardly from the interior surface 170 at the center portion 121 of center body connector 120. Flange 177 is typically located between pipe receiving portions 102, 103, and extends radially inwardly towards the longitudinal axis 300, resulting in an internal radius from the longitudinal axis 300 to the tube stop flange 177 of $R_{10}$. In some embodiments, $R_{10}$ is substantially equivalent to the internal radius of the piping element(s) 136 being connected, thereby enabling a seamless connection between the pipe(s) 136 from the perspective of fluids, etc., traveling within pipe(s) 136. In various embodiments, a bolt retaining block 125 is integrally formed with and is part of the center body connector 120, extending radially outwardly of the outer surface 421 of the center body connector 120. As shown in FIGS. 38 through 41, block 125 has a wall 178 forming a radial opening 127 and a pair of axial openings 129.

In various embodiments, as shown in FIGS. 38 through 41, for example, the flange 177 has a first side interior wall surface 177A and a second side interior wall surface 177B. At least a first portion of the body connector interior surface 170 extends from the first side interior wall surface 177A of the flange 177 to an axial end wall surface 158 and forms first 155 and second 157 compartments of increasing radial distance from the axis 300. In some embodiments, the interior radius of the pipe receiving portions 102, 103 may vary at different points along the longitudinal axis 300. This varying radius facilitates the receipt of different parts in, for example, packing arrangement 150. More specifically, as shown for example in FIGS. 38 through 41, the second or axially outer compartment 157 is associated with a first radius R11, and the first or axially inner segment 155 is associated with a second radius R12. The second or axially outer segment 157 can have a radius that varies along the longitudinal axis 300, such that the radius of the axial outer segment 157 varies from a larger radius at its axially outermost point 174 to a smaller radius at its axially innermost point 172. The axially innermost point 172 of segment 157 is also shared as the axially outermost point of axially inner segment 155. Thus, at axially innermost point 172 of segment 157, radius R11 equals radius R12. As shown in FIGS. 38 through 41, the first segment or compartment 155 has a substantially constant radial distance R12 from the axis 300. Further, the body connector outer surface 421 includes a thread 179 extending therealong at one or both pipe receiving portions 102, 103. The thread(s) 179 can be configured to mate with corresponding threaded portions of retaining cap 130.

The sealing elements, e.g., wiper seal 122 and sealing ring 124, in the embodiments of the invention as shown in FIGS. 34 through 50 can be substantially as shown and described in connection with FIGS. 20 through 24.

FIGS. 46 through 48 illustrate an exemplary embodiment of sealing ring retainer 126, which is configured to retain sealing elements such as sealing ring 124 and wiper seal 122 in the packing arrangement 150 while also facilitating smooth and secure engagement with an inserted piping element 136, particularly one with an annular groove 138 as shown in FIGS. 34 and 35. In various embodiments, the sealing ring retainer 126 can be formed from a steel, stainless steel, hardened steel, brass or similar metallic material as well as a non-metallic material, for example.

As its geometry suggests, sealing ring retainer 126 can be configured to fit within center body connector 120 substantially at the point between sealing member 124 and cap 130 from an axial perspective, and between piping element 136 and center body connector 120 from a radial perspective. As described above and as shown in FIG. 47, for example, various embodiments of the sealing ring retainer 126 can be bifurcated into two substantially semi-circular pieces, 126A and 126B, joined at circumferential seams 385. The pieces 126A and 126B can be held together in mating end-to-end contact through a tight fit between the center body connector 120, the cap 130 and an inserted piping element 136, and can further be held together through the insertion of support band 128 into a groove 387 formed by inner walls 380, 381 and 184 of the sealing ring retainer, as shown in FIGS. 37A, 37B and 48, and as described elsewhere herein.

In various embodiments, as shown in FIGS. 37A, 37B and 46 through 48, the sealing ring retainer 126 and/or each segment 126A/126B is a unitary, monolithic body having a radially extending inner surface 180, a radially outwardly extending mid-surface 182, an axially extending lip surface 181 extending from the radially outer tip 480 of surface 180 to the radially inner tip 482 of mid-surface 182, a ramp surface 183 extending both axially and radially outwardly from the radially outer tip 484 of the mid-surface 182 to a radially interior outer tip 485, and a base support surface 185 extending axially outwardly from radially interior outer tip 485 to radially exterior outer tip 487. The sealing ring retainer 126 further includes an axially outer surface 386 extending from outer tip 487 to axially inner tip 498. Axially outer surface 386 includes a lower edge surface 188 extending axially inwardly and radially inwardly from tip 488 to a notch 187, an upper edge surface 497 extending axially outwardly and radially inwardly from notch 187 to a support ridge 488 (i.e., the upper edge surface 497 extends axially inwardly and radially outwardly from the support ridge 488 to meet the lower edge surface 188 at the notch 187), and a base surface 186 extending radially outwardly from support ridge 488 to outer tip 487. On its radially inner portion 490, the sealing ring retainer 126 includes radially outwardly extending walls 380 and 381 sharing a common axially extending wall 184 which forms a circumferentially extending groove 387, as described elsewhere herein. An axially outer support surface 189 extends axially outwardly from the radially inner tip 491 of the wall 380 to outer tip 498. Further, a slide surface 382 extends axially and radially inwardly from the radially inner tip 493 of the wall 381 to a radially inner edge 495 of inner portion 490. Also, an axially-mid base surface 383 extends axially inwardly from inner edge 495 to axially interior lip edge 499. A lip step 399 extends radially outwardly from the axially interior lip edge 499 to a step edge 501, and a platform surface 384 extends axially from the step edge 501 to an axially interior base edge 503, which is the radially inner edge of surface 180.

It will be appreciated that three notches are effectively formed by elements and surfaces of sealing ring retainer 126. For example, an axially interior, radially exterior first notch 505 is formed by surfaces 181 and 182. An axially exterior second notch 187 is formed at the joint of surfaces 188 and 497, and an axially interior, radially interior third notch 511 is formed by surfaces 384 and 399. The first notch 505 securely pinches and retains a portion of sealing member 124 when the cap 130 is secured to the body connector 120, as shown in FIG. 37B. The second notch 187 mates with ridge 913 of the retaining cap 130 during operation, as surfaces 497 and 188 mate with corresponding surfaces 135 and 133, respectively, of retaining cap 130 when the cap is fully secured to the body connector 120. The third notch 511 securely engages the gap 138 in the piping element 136 when the cap 130 is fully secured to the body connector.

Figure 49:
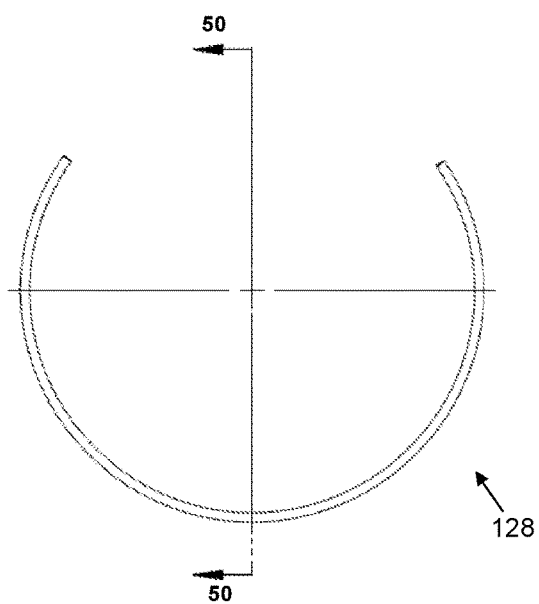
FIG. 49 is a right side view of a spring support band according to embodiments of the present invention.
Figure 50:
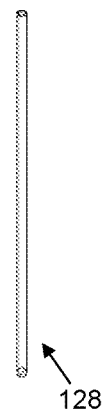
FIG. 50 is a cross-sectional view of the spring support band taken along line 50-50 of FIG. 49.

As shown in FIGS. 49 and 50, the spring support band 128 comprises an arc-shaped component that fits within the groove 387 formed in the sealing ring retainer 126 as described above. In various embodiments, the support band 128 is a split tension spring designed to keep pressure on the split sealing ring retainer 126 as part of the packing arrangement. Because the sealing ring retainer 126 can be provided in two halves, as described above, the support band acts as a tensioner keeping the two pieces together through assembly and operation. In embodiments, the spring support band 128 is biased outwardly, such that an expansive force is generated outwardly or convexly of the band 128. In various embodiments, the spring support band 128 can comprise a spring steel formulation, for example, that enables the band to be malformed during installation, while springing back into its originally manufactured position once installed.

As shown in FIGS. 42 through 45, the retaining cap 130 includes axially extending wall 195 formed with a radially extending wall 907. The radially extending wall 907 has an inner surface 930 and an outer surface 931. Similarly, the axially extending wall 195 has an inner surface 932 and an outer surface 933. A bolt retaining block 192 is formed with and extends radially outwardly from the axially extending wall outer surface 933, and block 192 has a bolt retaining cavity 198 therein. In various embodiments, the bolt retaining cavity 198 may be of smaller diameter on the axially outer side, as at 920, in order to accommodate a spring member, as described in connection with retaining cap 34 elsewhere herein. Axially extending wall 195 can be provided with reinforcing extensions 901 that may also be used as gripping points during manual installation and removal. Still referring to FIGS. 42 through 45, the axially extending wall inner surface 932 of the retaining cap 130 can form a cavity 196 extending through the retaining cap 130 for allowing a pipe (e.g., piping element 136 of FIG. 34) to pass through. The retaining cap 130 can also include internal threads 193 on the axially extending wall inner surface 932 that are configured to mate with threads 179 in the center body connector 120. In alternative embodiments, the retaining cap thread(s) can be provided on the axially extending wall outer surface 933. As shown in FIGS. 42 through 45, the axially outer wall 907 is provided with a neck 909 extending radially inwardly from the radially extending wall inner surface 930 to a head portion 915, wherein the head portion 915 includes a ridge 913 extending axially inwardly of the neck 909 for engaging the notch 187 of the sealing ring retainer 126 during operation, as described elsewhere herein.

In operation, the center body connector 120 is provided, having wiper seal 122, sealing ring 124, and sealing ring retainer 126 installed therein. As shown in FIG. 37A, sealing ring retainer 126 is not in mating contact with piping element 136 prior to the cap 130 being fully secured to center body connector 120. However, spring support band 128 can be inserted into the groove 387 of the sealing ring retainer 126 when the sealing ring retainer is inserted into place. A user may then install retaining cap 130 onto one end of a pipe 136 to be connected. The pipe 136 can then be inserted into one side of center body connector 120 with no resistance, and retaining cap 130 and the components therein can then be tightened onto center body connector 120 by threaded connection such that the thread 193 engages the thread 179 on the center body connector 120. The connection can further be secured by securing a bolt element 140 to the center body connector 20, thereby compressing packing arrangement 50 into place. In various embodiments, installation can occur by a user placing the pin 700 in the radial opening 127 of block 125 and rotating the retaining cap 130 for the threaded engagement. When the center body connector 120 is secured to the retaining cap 130, the center body connector axis and the retaining cap axis become coaxial.

Bolt element 140 is provided with head 160, body 162, threaded surface 164 and tip 166 for engaging the center body connector 120 similar to the way bolt element 40 engages center body connector 20 as described elsewhere herein, including with spring 142 being employed similar to spring 42. Bolt element 140 can further include an adapted head 160 having a flat head groove or "Philips head" groove for ease of operation. It will be appreciated that the axial compression force of rotating the retaining cap 130 translates into axial and radial compression of the packing arrangement 150 to create a tight seal. A similar procedure can be employed for the corresponding pipe 136 on the opposite side of connector 120. Once tightened, a leak proof, sealed connection is established. It will be appreciated that the location of the block 125 on the center body connector 120 with the bolt receiving openings 129 forces the alignment of the bolt(s) 140 on the retaining cap(s) 130 to occur without over-torquing the fitting. It will further be appreciated that the inner surface 930 of the radially extending wall 907 of the retaining cap 130 does not contact the axial end wall surface 158 of the center body connector 120 when fully tightened, so as to avoid unnecessary wear on these surfaces and to ensure that the sealing ring retainer is adequately compressed.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A locking pipe joint assembly, comprising:
a center body connector having an outer surface, an axial end wall surface, and an interior surface forming a cavity extending through the body connector along a center body connector axis, the center body connector including a flange formed so as to extend radially inwardly from the interior wall surface and a block extending radially outwardly from the outer surface, wherein the block is formed with at least one opening having an inner surface;
a retaining cap having a radially extending wall and an axially extending wall, with each of the radially extending and axially extending walls having respective inner and outer surfaces, with a bolt retaining block formed with and extending radially outwardly from the axially extending wall outer surface, with the bolt retaining block forming a bolt retaining cavity, wherein the retaining cap axially extending wall inner surface forms a cavity extending through the retaining cap along a retaining cap axis, wherein the retaining cap axially extending wall is adapted to threadedly engage the center body connector such that the center body connector axis and the retaining cap axis are coaxial; and
a first packing arrangement engaged with the retaining cap inner surface and the body connector interior surface, whereupon as the retaining cap threadedly engages the center body connector, the first packing arrangement is compressed, wherein the first packing arrangement comprises at least one sealing member and a sealing ring retainer, wherein the sealing ring retainer has an axially outer surface having a support ridge positioned radially inwardly of a tip, wherein the axially outer surface includes a lower edge surface extending axially inwardly and radially inwardly from the tip, and further includes an upper edge surface extending axially inwardly and radially outwardly from the support ridge such that the upper edge surface meets the lower edge surface at a notch.

2. The assembly of claim 1, further including a bolt element extending through the bolt retaining cavity of the retaining cap and the inner surface of the at least one opening in the block extending radially outwardly of the body connector outer surface.

3. The assembly of claim 1, wherein the center body connector flange has a first side interior wall surface and a second side interior wall surface, and wherein at least a first portion of the body connector interior wall surface extends from the first side interior wall surface of the flange to the axial end wall surface and forms at least first and second compartments, wherein the first compartment is of a constant radial distance from the center body connector axis and is positioned at an axially inner portion of the body connector, and wherein the second compartment extends from the first compartment toward the axial end wall surface and has a radial distance that increases from the first compartment axially outwardly toward the axial end wall surface.

4. The assembly of claim 1, wherein the body connector extends axially outwardly from the flange in a pair of opposite directions so as to form a first pipe receiving portion and a second pipe receiving portion, and further wherein the outer surface of the body connector corresponding to the first and second pipe receiving portions includes a thread extending therealong.

5. The assembly of claim 1, wherein the at least one opening of the block of the center body connector includes a pair of axial openings and a radial opening.

6. The assembly of claim 1, wherein the radially extending wall inner surface of the retaining cap includes a neck extending radially inwardly from the axially extending wall inner surface to a head portion, wherein the head portion has a ridge formed therewith that extends axially inwardly of the neck.

7. The assembly of claim 1, wherein the sealing ring retainer comprises a body having a radially extending inner surface, a radially outwardly extending mid-surface, and an axially extending lip surface extending from a radially outer tip of radially extending inner surface to a radially inner tip of mid-surface.

8. The assembly of claim 7, wherein the sealing ring retainer further comprises a ramp surface extending both axially and radially outwardly from the radially outer tip of the mid-surface to a radially interior outer tip, and a base support surface extending axially outwardly from the radially interior outer tip to a radially exterior outer tip.

9. The assembly of claim 8, wherein the sealing ring retainer body further includes an axially outer surface extending from the radially exterior outer tip to an axially inner tip, a lower edge surface extending axially inwardly and radially inwardly from a tip to a notch, an upper edge surface extending axially outwardly and radially inwardly from the notch to a support ridge, wherein the support ridge is positioned radially inwardly of the tip, and a base surface extending radially outwardly from the support ridge to radially exterior outer tip, and wherein the body further includes a radially inner portion having first and second radially outwardly extending walls sharing a common axially extending wall, wherein the radially outwardly extending walls and the axially extending wall form a circumferentially extending groove.

10. The assembly of claim 9, wherein the sealing ring retainer body further includes an axially outer support surface extending axially outwardly from a radially inner tip of a first one of the radially extending walls to an outer tip, a slide surface extending axially and radially inwardly from a radially inner tip of a second one of the radially extending walls to a radially inner edge of the radially inner portion of the body, an axially-mid base surface extending axially inwardly from an inner edge to an axially interior lip edge, a lip step extending radially outwardly from the axially interior lip edge to a step edge, and a platform surface extending axially from the step edge to an axially interior base edge.

11. The assembly of claim 1, wherein the sealing ring retainer comprises at least one body having a radially inner portion with first and second radially outwardly extending walls sharing a common axially extending wall, wherein the radially outwardly extending walls and the axially extending wall form a circumferentially extending groove.

12. The assembly of claim 11, wherein the sealing ring retainer comprises a body that is split.

13. The assembly of claim 11, wherein the sealing ring retainer comprises two or more bodies.

14. The assembly of claim 11, wherein the packing assembly further includes a spring support band positioned at least partially within the circumferentially extending groove.

15. The assembly of claim 1, wherein the packing arrangement includes first and second fastening rings.

16. The assembly of claim 15, wherein the second fastening ring has a base with a radially outer wall surface, an axially inner wall surface and an axially outer wall surface, and wherein the radially outer wall surface abuts the retaining cap inner surface, and wherein the axially inner wall surface abuts the axial end wall surface of the body connector.

17. The assembly of claim 1, wherein the sealing ring retainer has a radially inner portion and a radially extending inner surface, wherein the radially inner portion includes a platform surface extending axially outwardly of the radially extending inner surface and a lip step extending radially inwardly from the platform surface, wherein the platform surface and the lip step form a notch.

18. The assembly of claim 1, wherein the inner surface of the radially extending wall of the retaining cap does not contact the axial end wall surface of the center body connector.

19. A method of providing a locking pipe joint assembly, comprising:
   forming a center body connector with an outer surface, an axial end wall surface, and an interior surface forming a cavity extending through the body connector along a center body connector axis, the center body connector including a flange formed so as to extend radially inwardly from the interior wall surface and a block extending radially outwardly from the outer surface, wherein the block is formed with at least one opening having an inner surface;
   forming a retaining cap with a radially extending wall and an axially extending wall, with each of the radially extending and axially extending walls having respective inner and outer surfaces, with a bolt retaining block formed with and extending radially outwardly from the axially extending wall outer surface, with the bolt retaining block forming a bolt retaining cavity, wherein the retaining cap axially extending wall inner surface forms a cavity extending through the retaining cap along a retaining cap axis, and wherein the retaining cap axially extending wall is adapted to threadedly engage the body connector outer surface such that the center body connector axis and the retaining cap axis are coaxial; and
   providing a first packing arrangement for engagement with the retaining cap inner surface and the body connector interior surface, wherein the first packing arrangement comprises at least one sealing member and a sealing ring retainer, wherein the sealing ring retainer has an axially outer surface having a support ridge positioned radially inwardly of a tip, wherein the axially outer surface includes a lower edge surface extending axially inwardly and radially inwardly from the tip, and further includes an upper edge surface extending axially inwardly and radially outwardly from the support ridge such that the upper edge surface meets the lower edge surface at a notch.

20. The method of claim 19, wherein the sealing ring retainer has a radially inner portion and a radially extending inner surface, wherein the radially inner portion includes a platform surface extending axially outwardly of the radially extending inner surface and a lip step extending radially inwardly from the platform surface, wherein the platform surface and the lip step form a notch.

21. The method of claim 19, wherein the radially extending wall inner surface of the retaining cap includes a neck extending radially inwardly from the axially extending wall inner surface to a head portion, and wherein the head portion has a ridge formed therewith that extends axially inwardly of the neck.

22. A locking pipe joint assembly, comprising:
   a center body connector having a center portion, an outer surface, an axial end wall surface, and an interior surface forming a cavity extending through the body connector along a center body connector axis, the center body connector including a flange formed so as to extend radially inwardly from the interior wall surface and a block extending radially outwardly from the outer surface, wherein the block is formed with at least one opening having an inner surface, and further including a pair of pipe receiving portions extending axially from the center portion in opposite directions, wherein each of the pipe receiving portions includes a thread;
   at least one retaining cap having a radially extending wall and an axially extending wall, with each of the radially extending and axially extending walls having respective inner and outer surfaces, with a bolt retaining block formed with and extending radially outwardly from the axially extending wall outer surface, with the bolt retaining block forming a bolt retaining cavity, wherein the retaining cap axially extending wall inner surface forms a cavity extending through the retaining cap along a retaining cap axis, wherein the retaining cap axially extending wall includes a thread adapted to engage the thread of at least one of the pipe receiving portions of the center body connector;
   a bolt element extending through the bolt retaining cavity of the retaining cap and secured to the inner surface of the at least one opening in the block extending radially outwardly of the body connector outer surface; and
   a first packing arrangement for engagement with the retaining cap inner surface and the body connector interior surface, wherein the first packing arrangement comprises at least one sealing member and a sealing ring retainer, wherein the sealing ring retainer has an axially outer surface having a support ridge positioned radially inwardly of a tip, wherein the axially outer surface includes a lower edge surface extending axially inwardly and radially inwardly from the tip, and further includes an upper edge surface extending axially inwardly and radially outwardly from the support ridge such that the upper edge surface meets the lower edge surface at a notch.

23. The assembly of claim 22, wherein the first packing is compressed as the retaining cap threadedly engages the center body connector.

24. The assembly of claim 22, wherein the at least one retaining cap comprises first and second retaining caps, and wherein each of the retaining caps is adapted to engage the respective thread of a respective one of the pipe receiving portions of the center body connector.

* * * * *